US011330119B2

(12) United States Patent
Miyamoto

(10) Patent No.: US 11,330,119 B2
(45) Date of Patent: May 10, 2022

(54) INFORMATION PROCESSING APPARATUS, CONTROL METHOD AND STORAGE MEDIUM

(71) Applicant: CANON KABUSHIKI KAISHA, Tokyo (JP)

(72) Inventor: Daijiro Miyamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 46 days.

(21) Appl. No.: 16/851,236

(22) Filed: Apr. 17, 2020

(65) Prior Publication Data
US 2020/0344362 A1    Oct. 29, 2020

(30) Foreign Application Priority Data

Apr. 23, 2019    (JP) .............................. JP2019-081885

(51) Int. Cl.
*H04N 1/00*    (2006.01)
*G06K 9/00*    (2022.01)
*G06V 30/413*    (2022.01)

(52) U.S. Cl.
CPC ......... *H04N 1/0044* (2013.01); *G06V 30/413* (2022.01); *H04N 1/00411* (2013.01)

(58) Field of Classification Search
CPC . H04N 1/0044; H04N 1/00411; G06V 30/413
USPC ....................................................... 358/442
See application file for complete search history.

(56) References Cited

U.S. PATENT DOCUMENTS

| 5,926,633 | A  | * | 7/1999 | Takagi | .................... | G06F 9/451 |
| | | | | | | 345/619 |
| 6,172,704 | B1 | * | 1/2001 | Kunishige | ............ | H04N 1/0402 |
| | | | | | | 348/96 |
| 6,301,586 | B1 | * | 10/2001 | Yang | ........................ | G06F 16/40 |
| 6,317,225 | B1 | * | 11/2001 | Kim | .................... | H04N 1/00803 |
| | | | | | | 358/448 |
| 6,636,330 | B2 | * | 10/2003 | Matsumura | .......... | H04N 1/3875 |
| | | | | | | 345/581 |
| 8,949,287 | B2 | * | 2/2015 | Hull | .................... | G06K 9/00442 |
| | | | | | | 707/804 |
| 9,100,518 | B2 | * | 8/2015 | Kyojima | ............ | H04N 1/00328 |

(Continued)

FOREIGN PATENT DOCUMENTS

| JP | 2007-065809 | 3/2007 |
| JP | 2008-071050 | 3/2008 |

(Continued)

OTHER PUBLICATIONS

U.S. Appl. No. 16/851,223, filed Apr. 17, 2020.
(Continued)

*Primary Examiner* — Allen H Nguyen
(74) *Attorney, Agent, or Firm* — Venable LLP

(57) ABSTRACT

To make it possible for a user to easily modify the recognition state of a document by document recognition processing at the time of multi-cropping processing. A preview screen is displayed on a user interface, which displays the results of the document recognition processing for a scanned image obtained by scanning a plurality of documents en bloc on the scanned image in an overlapping manner. Then, a button for dividing the detected document area is displayed on the preview screen so that it is made possible for a user to easily perform division.

18 Claims, 22 Drawing Sheets

(56) References Cited

U.S. PATENT DOCUMENTS

| | | | |
|---|---|---|---|
| 9,332,159 B2* | 5/2016 | Sakatani | H04N 1/6091 |
| 9,781,291 B2* | 10/2017 | Oshima | H04N 1/19594 |
| 10,984,232 B2* | 4/2021 | Matsumoto | G06K 9/6878 |
| 11,095,789 B2* | 8/2021 | Nishiyama | H04N 1/00477 |
| 2004/0190057 A1* | 9/2004 | Takahashi | G06F 3/1275 |
| | | | 358/1.15 |
| 2005/0094208 A1* | 5/2005 | Mori | G06F 40/166 |
| | | | 358/1.18 |
| 2006/0039609 A1* | 2/2006 | Takano | G06K 15/00 |
| | | | 382/190 |
| 2006/0072830 A1* | 4/2006 | Nagarajan | G06K 9/00463 |
| | | | 382/224 |
| 2007/0061723 A1 | 3/2007 | Ohga et al. | 715/705 |
| 2007/0268522 A1* | 11/2007 | Miyamoto | G06F 40/174 |
| | | | 358/1.18 |
| 2009/0021762 A1* | 1/2009 | Saito | H04N 1/2307 |
| | | | 358/1.13 |
| 2010/0097640 A1* | 4/2010 | Kim | H04N 1/32502 |
| | | | 358/1.15 |
| 2010/0110464 A1* | 5/2010 | Kardamilas | H04N 1/00405 |
| | | | 358/1.13 |
| 2010/0315689 A1* | 12/2010 | Hayakawa | H04N 1/0071 |
| | | | 358/474 |
| 2011/0205171 A1* | 8/2011 | Akiyoshi | G11B 27/034 |
| | | | 345/173 |
| 2011/0205601 A1* | 8/2011 | Akimoto | G03G 21/046 |
| | | | 358/475 |
| 2011/0242568 A1 | 10/2011 | Soga | 358/1.13 |
| 2012/0008176 A1* | 1/2012 | Ishida | H04N 1/3872 |
| | | | 358/474 |
| 2012/0075442 A1* | 3/2012 | Vujic | G07C 9/257 |
| | | | 348/61 |
| 2015/0262034 A1* | 9/2015 | Hayakawa | G06K 9/342 |
| | | | 382/195 |
| 2015/0286906 A1* | 10/2015 | Murakami | H04N 1/393 |
| | | | 358/1.2 |
| 2015/0317531 A1* | 11/2015 | Kawano | H04N 1/00204 |
| | | | 382/176 |
| 2016/0042229 A1* | 2/2016 | Liao | G06K 9/00442 |
| | | | 358/403 |
| 2016/0055375 A1* | 2/2016 | Neavin | G06K 9/00456 |
| | | | 382/218 |
| 2016/0147386 A1* | 5/2016 | Han | G06F 40/279 |
| | | | 715/838 |
| 2017/0039745 A1* | 2/2017 | Hayakawa | H04N 1/00161 |
| 2018/0218208 A1 | 8/2018 | Arakawa | G06K 9/72 |
| 2018/0220014 A1* | 8/2018 | Hayakawa | H04N 1/00251 |
| 2019/0102926 A1* | 4/2019 | Obayashi | G06T 11/60 |
| 2019/0324695 A1* | 10/2019 | Hayakawa | G06F 3/1252 |
| 2020/0042261 A1 | 2/2020 | Mochizuki | H04N 1/4426 |
| 2020/0076975 A1* | 3/2020 | Nishiyama | H04N 1/00708 |
| 2020/0288023 A1* | 9/2020 | Hayakawa | H04N 1/00196 |
| 2020/0382654 A1* | 12/2020 | Soga | G06T 3/40 |
| 2020/0396351 A1* | 12/2020 | Saitoh | G06K 9/033 |
| 2021/0042066 A1* | 2/2021 | Kitabatake | G06F 3/1253 |
| 2021/0042976 A1* | 2/2021 | Yamada | G06T 11/60 |
| 2021/0067657 A1* | 3/2021 | Tungatkar | H04N 1/387 |

FOREIGN PATENT DOCUMENTS

| | | |
|---|---|---|
| JP | 2012-243229 | 12/2012 |
| JP | 2015-173418 | 10/2015 |
| JP | 2016-186717 | 10/2016 |
| JP | 2018-124656 | 8/2018 |

OTHER PUBLICATIONS

U.S. Appl. No. 16/851,222, filed Apr. 17, 2020.
U.S. Appl. No. 16/851,215, filed Apr. 17, 2020.
U.S. Appl. No. 16/851,230, filed Apr. 17, 2020.

* cited by examiner

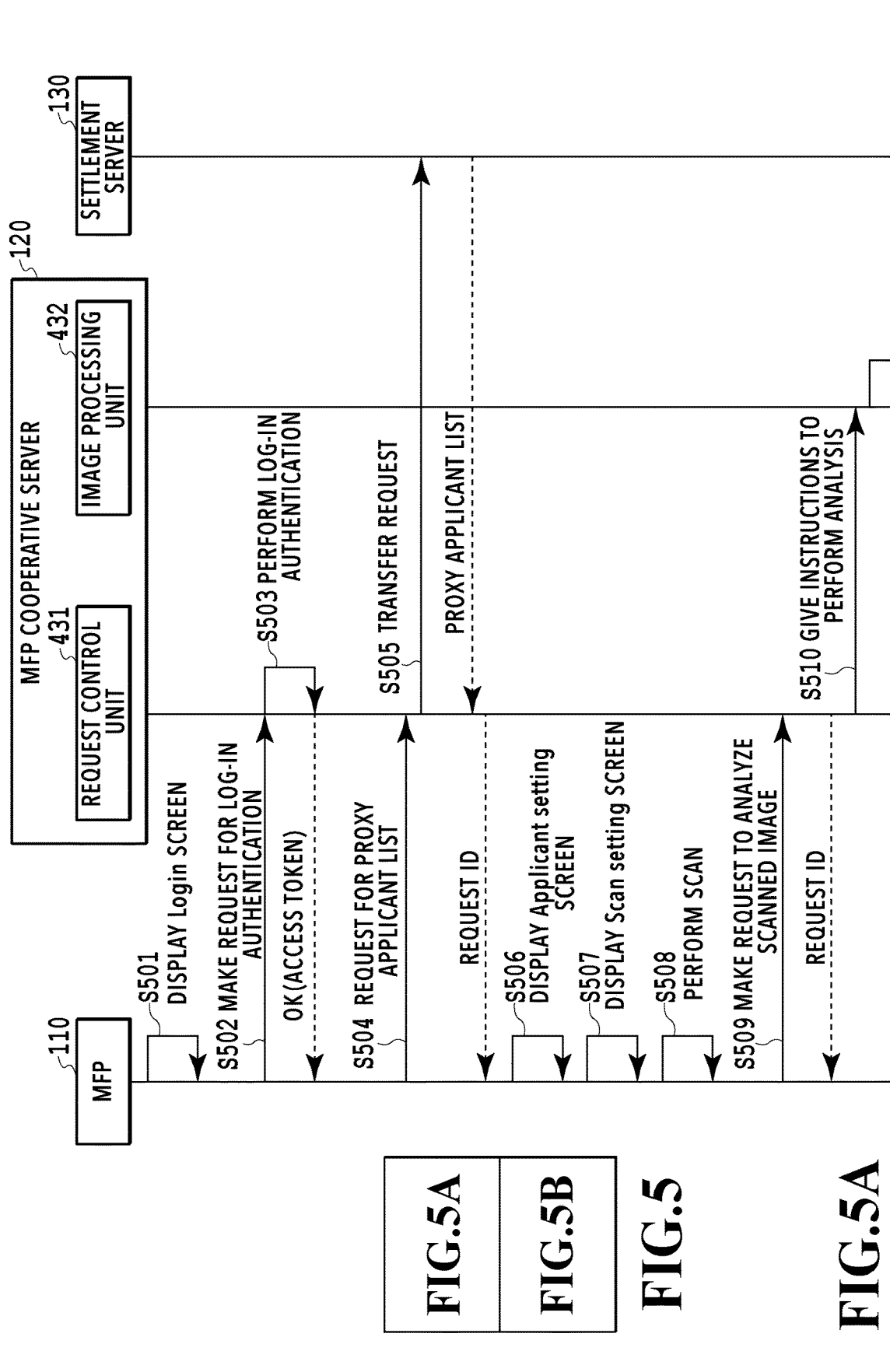

```
{
    "Delegators":[
        {
         "UserID" :"UserB@xxxxx.com",
         "UserName":"UserB"
        },
        {
         "UserID" :"UserC@xxxxx.com",
         "UserName":"UserC"
        },
        {
         "UserID" :"UserD@xxxxx.com",
         "UserName":"UserD"
        }
    ]
}
```

FIG.8

Applicant setting ~900

Select your name in a case where you perform application, or select the user name of a proxy applicant in a case of proxy application.

User name: | UserB ▼ | ~902

~901
Next

FIG.9

FIG.12A
```
{
    "JobID":"12345678"
}
```

FIG.12B
```
{
    "Status":"processing"
}
```

FIG.12C
```
{
        "Status" : "completed",
        "Images" : [
            {
                        "ImageID" : "image0001",
                        "Accuracy" : "1.0",
                        "Points" : [213,367,2255,297,2283,1295,245,1371]
            },
            {
                        "ImageID" : "image0002",
                        "Accuracy" : "1.0",
                        "Points" : [897,1611,1833,1583,1867,2989,933,3005]
            },
            {
                        "ImageID" : "image0003",
                        "Accuracy" : "0.5",
                        "Points" : [3011,621,3893,623,3887,2543,3009,2539],
                        "DivideCandidate" :
                        [
                            {
                                        "DivideID" : "image0003-divide0001",
                                        "Point1" : [3010,1537],
                                        "Point2" : [3890,1542]
                            }
                        ]
            }
        ]
}
```

FIG.14A
```
{
    "DivideID" : ["image0003-divide0001"]
}
```

FIG.14B
```
{
    "Images" : ["image0004","image0005"]
}
```

FIG.14C
```
{
    "SendImages" : ["image0001","image0002","image0004","image0005"]
}
```

FIG.14D
```
{
    "SendImages" : [
        {
            "ImageID" : "image0001",
            "Points" : [213,367,2255,297,2283,1295,245,1371]
        },
        {
            "ImageID" : "image0002",
            "Points" : [897,1611,1833,1583,1867,2989,933,3005]
        },
        {
            "ImageID" : "image0004",
            "Points" : [3011,621,3893,623,3890,1475,3010,1471]
        },
        {
            "ImageID" : "image0005",
            "Points" : [2960,1471,3890,1475,3887,2543,2959,2539]
        }
    ]
}
```

~1600

~1601

FIG.20A
```
{
    "DividePoint" : [3401,1473]
}
```

FIG.20B
```
{
    "Status" : "succeeded",
    "Images" : [
        {
            "ImageID" : "image0001",
            "Accuracy" : "1.0",
            "Points" : [213,367,2255,297,2283,1295,245,1371]
        },
        {
            "ImageID" : "image0002",
            "Accuracy" : "1.0",
            "Points" : [897,1611,1833,1583,1867,2989,933,3005]
        },
        {
            "ImageID" : "image0003",
            "Accuracy" : "0.5",
            "Points" : [3011,621,3893,623,3887,2543,3009,2539],
            "DivideCandidate" :
            [
                {
                    "DivideID" : "image0003-divide0001",
                    "Point1" : [3010,1471],
                    "Point2" : [3890,1475]
                }
            ]
        }
    ]
}
```

INFORMATION PROCESSING APPARATUS, CONTROL METHOD AND STORAGE MEDIUM

BACKGROUND OF THE INVENTION

Field of the Invention

The present invention relates to multi-cropping processing of a scanned image.

Description of the Related Art

Conventionally, there is multi-cropping processing to scan a plurality of documents, such as receipts, business cards, and various certificates, arranged side by side or one on top of another on a document table of a scanner apparatus, perform document recognition processing for the scanned image, and cut out the image of a recognized document from the scanned image. Japanese Patent Laid-Open No. 2015-173418 has disclosed a method of appropriately determining a document area by specifying an object corresponding to document contents to determine the document area even in a case where it is not possible to successfully extract the edge of the document.

With the method of Japanese Patent Laid-Open No. 2015-173418 described above, the document area is determined based on the distance between objects. Because of this, in a case where documents placed on the document table are not separate sufficiently and the distance between the objects is small, it may happen that it is difficult to accurately recognize the document area for each of the plurality of documents. Then, in a case where image areas corresponding to a plurality of documents are included in one detected document area, it is necessary for a user to perform the scan again so as to obtain the document area in units of documents for each of the plurality of documents by rearranging the documents on the document table, and so on.

An object of the present invention is to make it possible for a user to easily modify the recognition state of a document in document recognition processing at the time of multi-cropping processing in order to deal with the above-described problem.

SUMMARY OF THE INVENTION

The apparatus according to the present invention is an apparatus comprising a user interface that presents information to a user and receives an input operation by a user, the apparatus comprising: an acquisition unit configured to acquire results of document recognition processing for a scanned image obtained by scanning a plurality of documents en bloc; and a display control unit configured to display a preview screen on the user interface, which displays the results acquired by the acquisition unit on the scanned image in an overlapping manner, and the display control unit displays a button on the preview screen, with which a user gives instructions to divide a document area that satisfies a predetermined condition among document areas corresponding to one or a plurality of documents included in the results.

Further features of the present invention will become apparent from the following description of exemplary embodiments with reference to the attached drawings.

BRIEF DESCRIPTION OF THE DRAWINGS

FIG. 8 is a diagram showing an example of a proxy applicant list;

FIG. 9 is a diagram showing an example of an Applicant setting screen;

FIG. 12A is a diagram showing an example of a request ID, FIG. 12B is a diagram showing an example of a response indicating that processing is in progress, and FIG. 12C is a diagram showing an example of a response indicating that processing is completed;

FIG. 14A is a diagram showing an example of a division request, FIG. 14B is a diagram showing an example of a response to a division request, and FIG. 14C and FIG. 14D are each a diagram showing an example of a registration request;

FIG. 20A is a diagram showing an example of a division determination request and FIG. 20B is a diagram showing an example of a response to a division determination request.

DESCRIPTION OF THE EMBODIMENTS

Hereinafter, with reference to the attached drawings, the present invention is explained in detail in accordance with preferred embodiments. Configuration shown in the following embodiments are merely exemplary and the present invention is not limited to the configurations shown schematically.

First Embodiment

<System Configuration>

Figure 1:
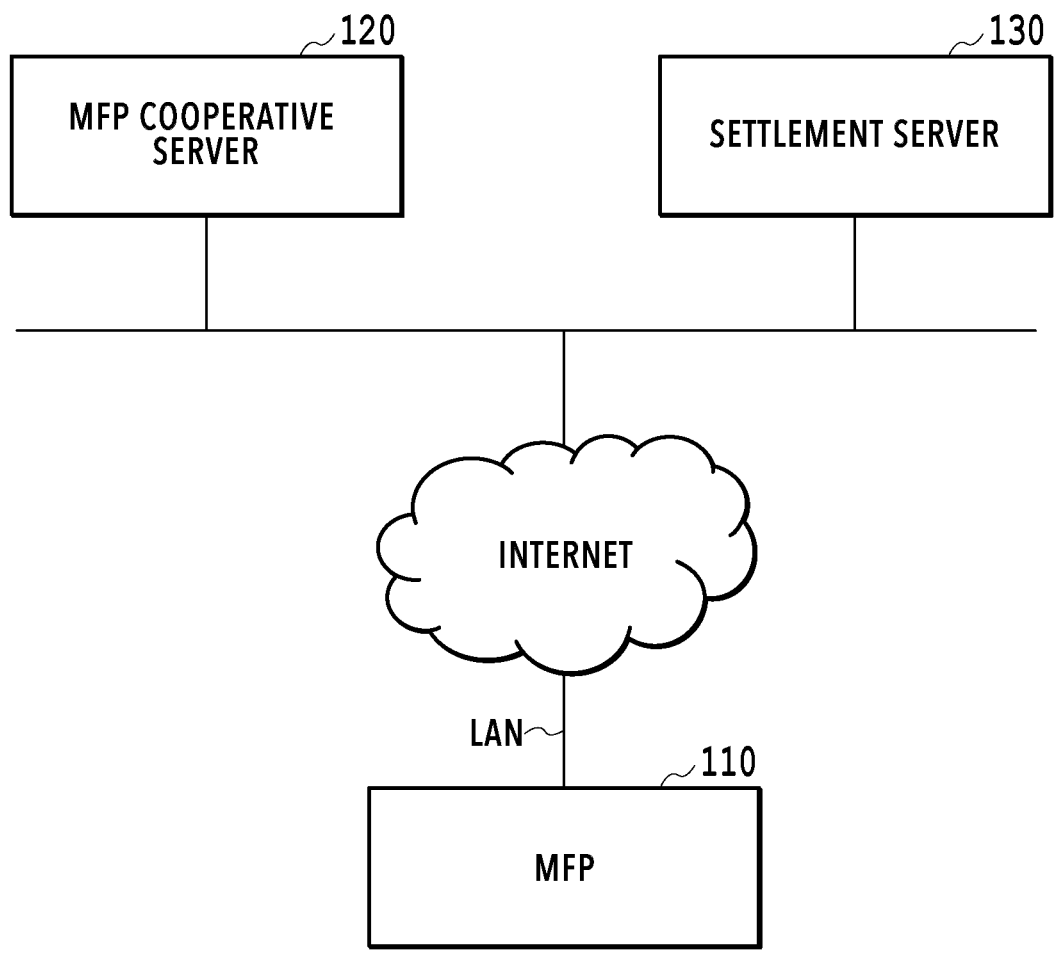
FIG. 1 is a diagram showing an entire configuration of an image processing system.

FIG. 1 is a diagram showing the entire configuration of an image processing system 100 according to the present embodiment. The image processing system 100 includes an MFP (Multi Function Peripheral) 110 and server apparatuses 120 and 130 providing cloud services on the internet. The MFP 110 is connected with the server apparatuses 120 and 130 so as to be capable of communication via the internet.

The MFP 110 is an example of an information processing apparatus having the scan function. The MFP 110 is a multi function peripheral having a plurality of functions, such as the print function and the BOX save function, in addition to the scan function. Both the server apparatuses 120 and 130 are each an example of an information processing apparatus providing cloud services. The server apparatus 120 of the present embodiment provides cloud services to perform image analysis including multi-cropping processing for scanned image data received from the MFP 110, transfer a request from the MFP 110 to the server apparatus 130 providing other serviced, and so on. In the following, the cloud service provided by the server apparatus 120 is called "MFP cooperative service". The server apparatus 130 provides a cloud service (hereinafter, called "expense settlement service") for performing expense settlement efficiently. In the expense settlement service, in a case where receipts are saved and managed by associating the images of the receipts with additional information (metadata), such as dates of the receipts, or a person other than the person who has received a receipt performs the computerization work of the receipt, it is possible to set a person (proxy applicant) who performs the work. Hereinafter, the server apparatus 120 that provides the MFP cooperative service is called "MFP cooperative server" and the server apparatus 130 that provides the expense settlement service is called "settlement server".

The configuration of the image processing system 100 shown in FIG. 1 is an example and the configuration is not limited to this. For example, the MFP 110 may also have the function of the MFP cooperative server 120. Further, the MFP cooperative server 120 may be connected with the MFP 110 via a LAN (Local Area Network) in place of the internet. Furthermore, in the present embodiment, explanation is given by taking a receipt as an example of the computerization work-target document, but the target document is not limited to a receipt.

<Hardware Configuration of MFP>

Figure 2:
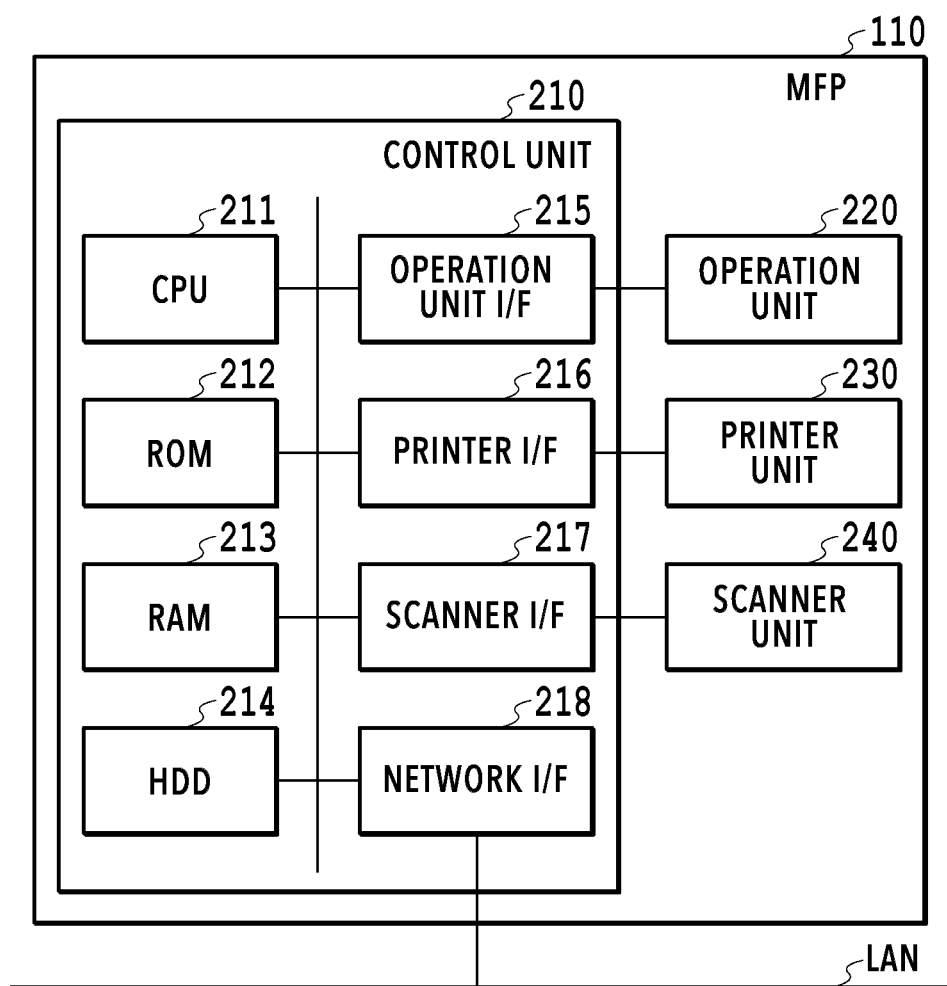
FIG. 2 is a block diagram showing a hardware configuration of an MFP.

FIG. 2 is a block diagram showing the hardware configuration of the MFP 110. The MFP 110 includes a control unit 210, an operation unit 220, a printer unit 230, and a scanner unit 240. The control unit 210 further includes each of units 211 to 218 below and controls the operation of the entire MFP 110. The CUP 211 reads various control programs (programs corresponding to various functions shown in the software configuration diagram, to be described later) stored in the ROM 212 and executes the programs. The RAM 213 is used as a temporary storage area, such as a main memory and a work area, of the CPU 211. In present embodiment, the one CPU 211 performs each piece of processing shown in the flowchart, to be described later, by using one memory (RAM 213 or HDD 214), but the present embodiment is not limited to this. For example, it may also be possible to perform each piece of processing by causing a plurality of CPUs and a plurality of RAMs or HDDs to cooperate with each other. The HDD 214 is a large-capacity storage unit configured to store image data and various programs. The operation unit I/F 215 is an interface that connects the operation unit 220 and the control unit 210. The operation unit 220 is provided with a touch panel and a hard key and receives operations/inputs/instructions by a user. The printer I/F 216 is an interface that connects the printer unit 230 and the control unit 210. Image data for printing is transferred from the control unit 210 to the printer unit 230 via the printer I/F 216 and printed on a printing medium, such as paper. The scanner I/F 217 is an interface that connects the scanner unit 240 and the control unit 210. The scanner unit 240 inputs an image (scanned image) obtained by scanning a document that is set on a document table or ADF (Auto Document Feeder), not shown schematically, to the control unit 210 via the scanner I/F 217. It is possible to print (copy and output) the scanned image data generated by the scanner unit 240 in the printer unit 230, save the data in the HDD 214, transmit the data to an external apparatus via a LAN, and so on. The network I/F 218 is an interface that connects the control unit 210 (MFP 110) to a LAN. The MFP 110 transmits scanned image data to the MFP cooperative server 120, receives various kinds of data from the MFP cooperative server 120, and so on, by using the network I/F 218. The hardware configuration of the MFP 110 explained above is an example and the hardware configuration may comprise another configuration as needed or may not have a part of the configuration.

<Hardware Configuration of Server Apparatus>

Figure 3:
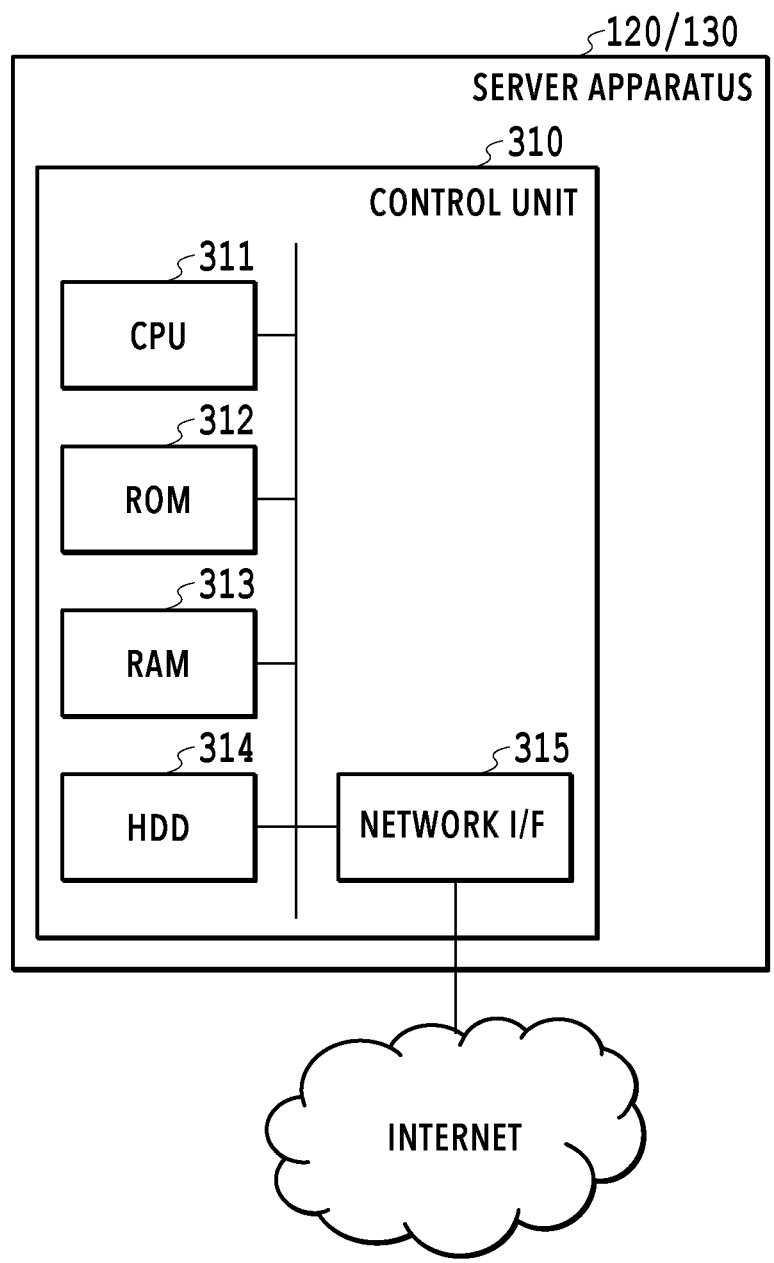
FIG. 3 is a block diagram showing a hardware configuration of an MFP cooperative server and a settlement server.

FIG. 3 is a block diagram showing the hardware configuration of the MFP cooperative server 120/the settlement server 130. The MFP cooperative server 120 and the settlement server 130 have the common hardware configuration and include a CPU 311, a ROM 312, a RAM 313, an HDD 314, and a network I/F 315. The CPU 311 controls the entire operation by reading control programs stored in the ROM 312 and performing various kinds of processing. The RAM 313 is used as a temporary storage area, such as a main memory and a work area, of the CPU 311. The HDD 314 is a large-capacity storage unit configured to store image data and various programs. The network I/F 315 is an interface that connects a control unit 310 to the internet. The MFP cooperative server 120 and the settlement server 130 receive requests for various kinds of processing from other apparatuses (MFP 110 and the like) via the network I/F 315 and return processing results in accordance with the requests.

<Software Configuration of Image Processing System>

Figure 4:
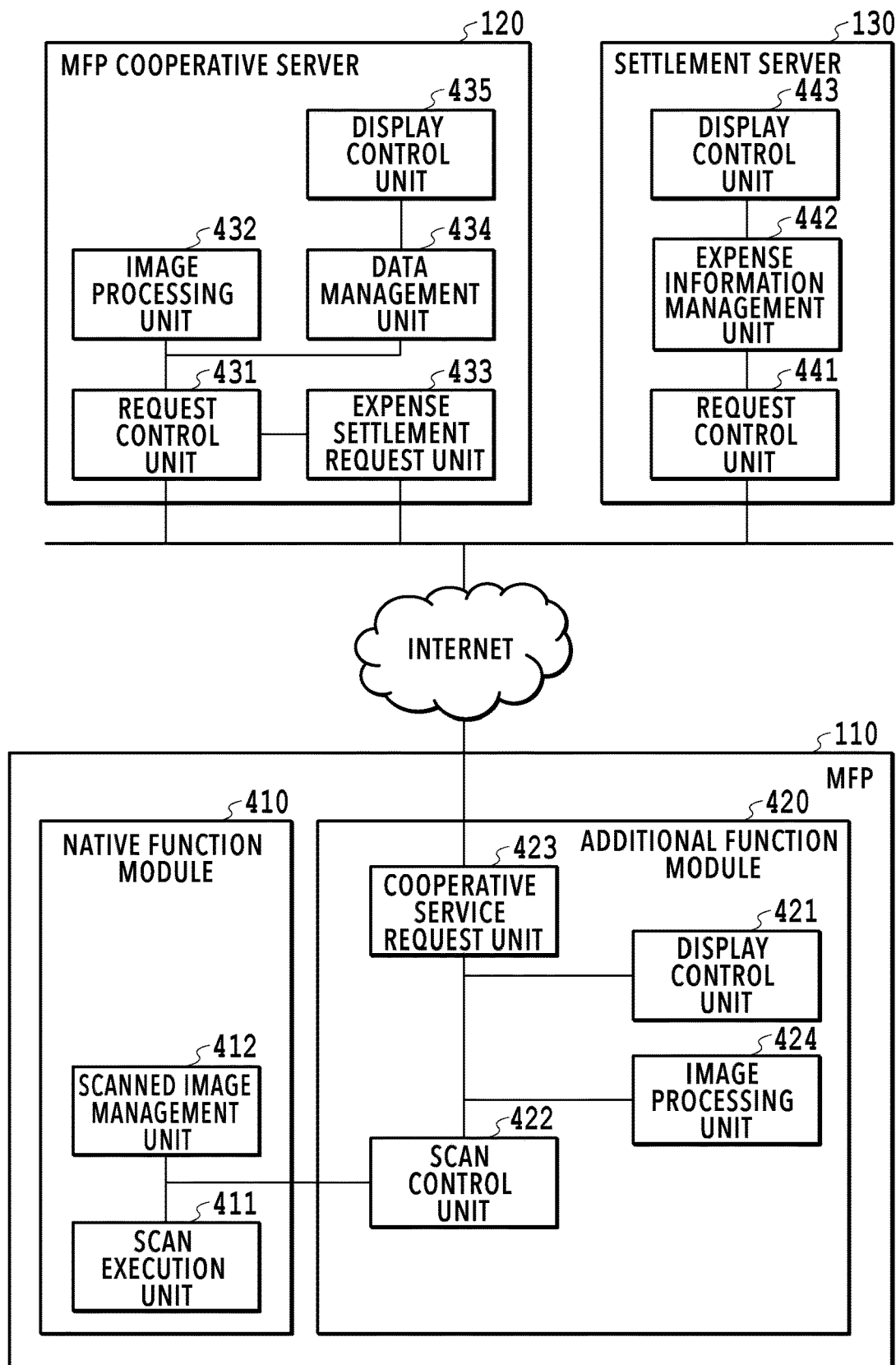
FIG. 4 is a block diagram showing a software configuration of the image processing system.

FIG. 4 is a block diagram showing the software configuration of the image processing system 100 according to the present embodiment. In the following, the software configuration corresponding to the role of each of the MFP 110, the MFP cooperative server 120, and the settlement server 130, which configure the image processing system 100, is explained in order. In the following, explanation is given by narrowing the various functions possessed by each apparatus to the functions relating to the processing to scan a receipt as a document and perform expense settlement.

<<Software Configuration of MFP>>

The function modules of the MFP 110 are roughly divided into a native function module 410 and an additional function module 420. While the native function module 410 is an application provided as a standard one in the MFP 110, the additional function module 420 is an application that is installed additionally in the MFP 110. The additional function module 420 is an application based on Java (registered trademark) and it is possible to easily implement the addition of a function to the MFP 110.

The native function module 410 has a scan execution unit 411 and a scanned image management unit 412. Further, the additional function module 420 has a display control unit 421, a scan control unit 422, a cooperative service request unit 423, and an image processing unit 424.

The display control unit 421 displays a user interface screen (UI screen) for presenting information necessary for a user and receiving various operations by a user on a liquid crystal display unit having the touch panel function of the operation unit 220. The various operations by a user include, for example, inputting of log-in authentication information for accessing the MFP cooperative server 120, which is an external apparatus, selection of a proxy applicant in a case where a proxy applicant performs the receipt computerization work, scan setting, giving of scan start instructions, inputting of metadata, and the like. As a representative UI screen in the present embodiment, there is a preview screen based on document recognition processing results received from the MFP cooperative server 120. It is possible for a user to give instructions to perform modification, such as division and combination, for the document area corresponding to the one document or a plurality of documents detected by the document recognition processing on the preview screen displayed on the operation unit 220.

The scan control unit 422 gives instructions to perform scan processing to the scan execution unit 411 along with scan setting information in accordance with the user operation (for example, pressing down of "Start scan" button) performed on the UI screen. The scan execution unit 411 causes the scanner unit 240 to perform the document reading operation via the scanner I/F 217 and generates scanned image data in accordance with the instructions to perform scan processing from the scan control unit 422. The generated scanned image data is saved in the HDD 214 by the scanned image management unit 412. At this time, the scan control unit 422 is notified of information on a scanned image identifier uniquely indicating the saved scanned image data.

The cooperative service request unit 423 makes requests for various kinds of processing to the MFP cooperative server 120, receives responses thereto, and so on. The various kinds of processing include, for example, log-in authentication, acquisition of a list of proxy applicants who can perform expense settlement as a proxy, execution of multi-cropping processing for scanned image data obtained by scanning a plurality of receipts, acquisition of metadata item information, setting of metadata, and the like. For transmission and reception with the MFP cooperative server 120, the communication protocol, for example, such as REST and SOAP, is used.

The image processing unit 424 generates an image used on the UI screen that is displayed by the display control unit 421 by performing predetermined image processing for scanned image data obtained by scanning a plurality of receipts.

<<Software Configuration of Server Apparatus>>

First, the software configuration of the MFP cooperative server 120 is explained. The MFP cooperative server 120 has a request control unit 431, an image processing unit 432, an expense settlement request unit 433, a data management unit 434, and a display control unit 435. The request control unit 431 stands by in the state of being capable of receiving a request from an external apparatus and instructs the image processing unit 432, the expense settlement request unit 433, and the data management unit 434 to perform predetermined processing in accordance with received request contents. The image processing unit 432 performs image analysis processing, such as multi-cropping processing and OCR processing, for scanned image data that is sent from the MFP 110. The expense settlement request unit 433 makes requests for various kinds of processing relating to the expense settlement service to the settlement server 130, receives the responses thereto, and so on. The various kinds of processing include, for example, acquisition of lists of proxy applicants and the types of expense, registration of an image corresponding to each receipt obtained by the multi-cropping processing, setting of metadata corresponding to each image, and the like. The data management unit 434 stores and manages user information, various kinds of setting data, and the like, which are managed in the server apparatus 120. The display control unit 435 receives a request from the web browser running on a PC or a mobile terminal (neither of them is shown schematically) connected via the internet and returns screen configuration information (HTML, CSS, and the like) that is necessary for the screen display. It is possible for a user to check the registered user information, change the scan setting, and so on, via the screen displayed on the web browser.

Next, the software configuration of the settlement server 130 is explained. The settlement server 130 has a request control unit 441, an expense information management unit 442, and a display control unit 443. The request control unit 441 stands by in the state of being capable of receiving a request from an external apparatus and in the present embodiment, returns information that is managed by the expense information management unit 442 to the MFP cooperative server 120 in response to the request from the MFP cooperative server 120. The display control unit 443 receives a request from a web browser running on a PC or a mobile terminal (neither of them is shown schematically) connected via the internet and returns screen configuration information (HTML, CSS, and the like) that is necessary for the screen display. It is possible for a user to check the expense information including information on a registered expense report and receipt images, and so on, via the screen that is displayed on the web browser.

<Flow of Processing of Entire Image Processing System>

Figure 5B:
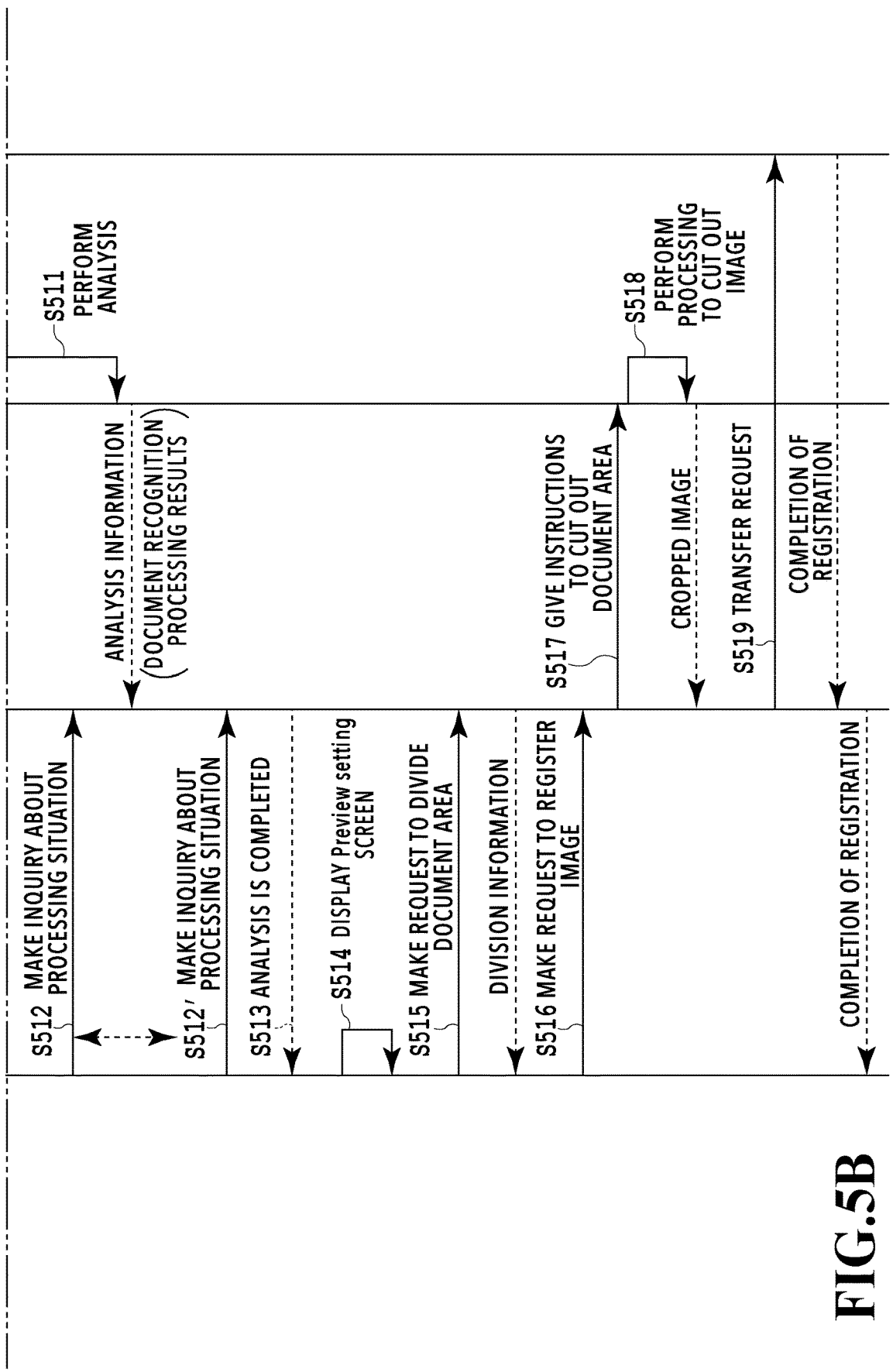
FIG. 5 is a diagram showing a relationship between FIGS. 5A and 5B, and FIGS. 5A and 5B are sequence diagrams showing a flow of processing among apparatuses at the time of performing expense settlement by a cloud service.
Figure 6:
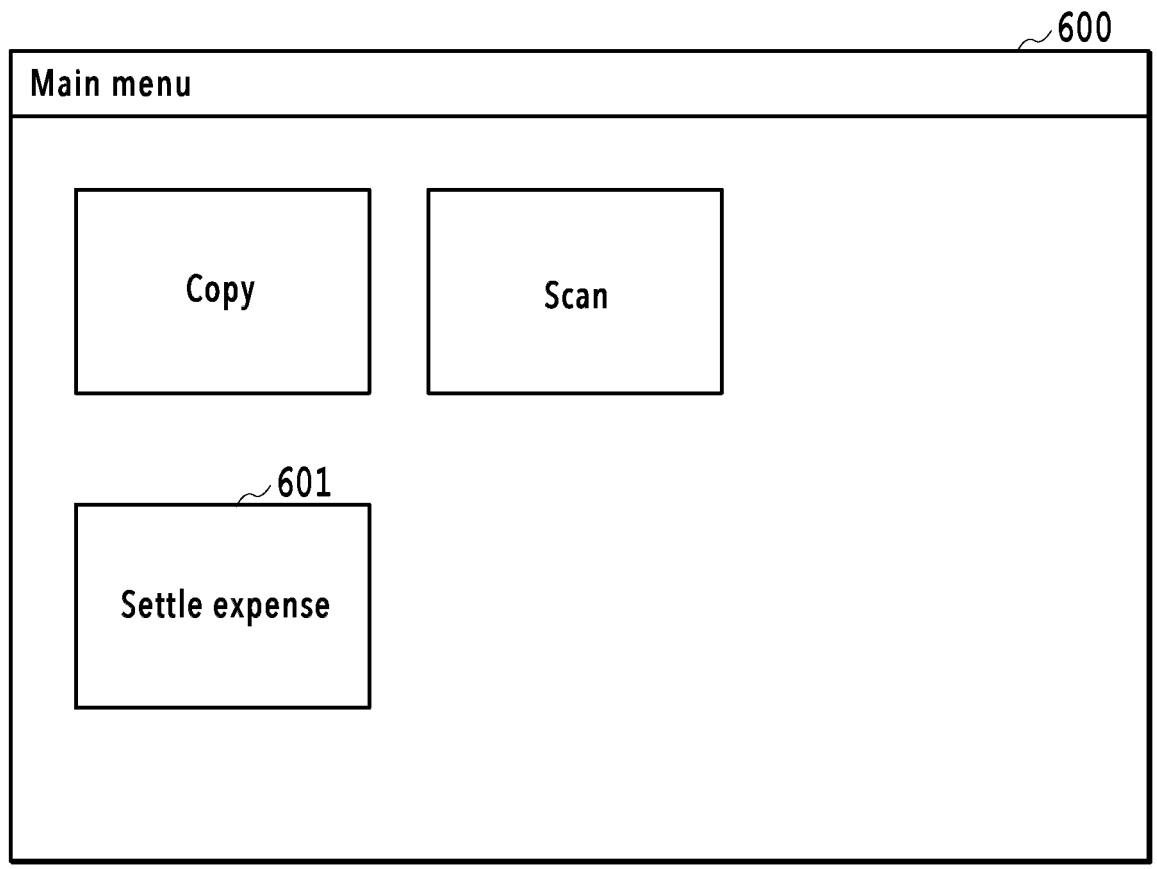
FIG. 6 is a diagram showing an example of a Main menu screen.

FIGS. 5A and 5B are sequence diagrams showing a flow of processing among the apparatuses at the time of scanning a receipt in the MFP 110 and performing expense settlement by the cloud service. FIG. 6 is a diagram showing an example of a UI screen of a Main menu (hereinafter, described as "Main screen") that is displayed at the time of the activation of the MFP 110. By installing a dedicated application necessary to use the expense settlement service in the MFP 110, a "Settle expense" button 601 is displayed on a Main screen 600. Then, in a case where a user presses down the "Settle expense" button 601 among the menu buttons displayed within the Main screen 600, the series of processing shown in the sequence diagrams in FIGS. 5A and 5B starts. In the following, along the sequence diagrams in FIGS. 5A and 5B, the operations among the apparatuses are explained in a time series. In the following explanation, symbol "S" represents a step.

Figure 7:
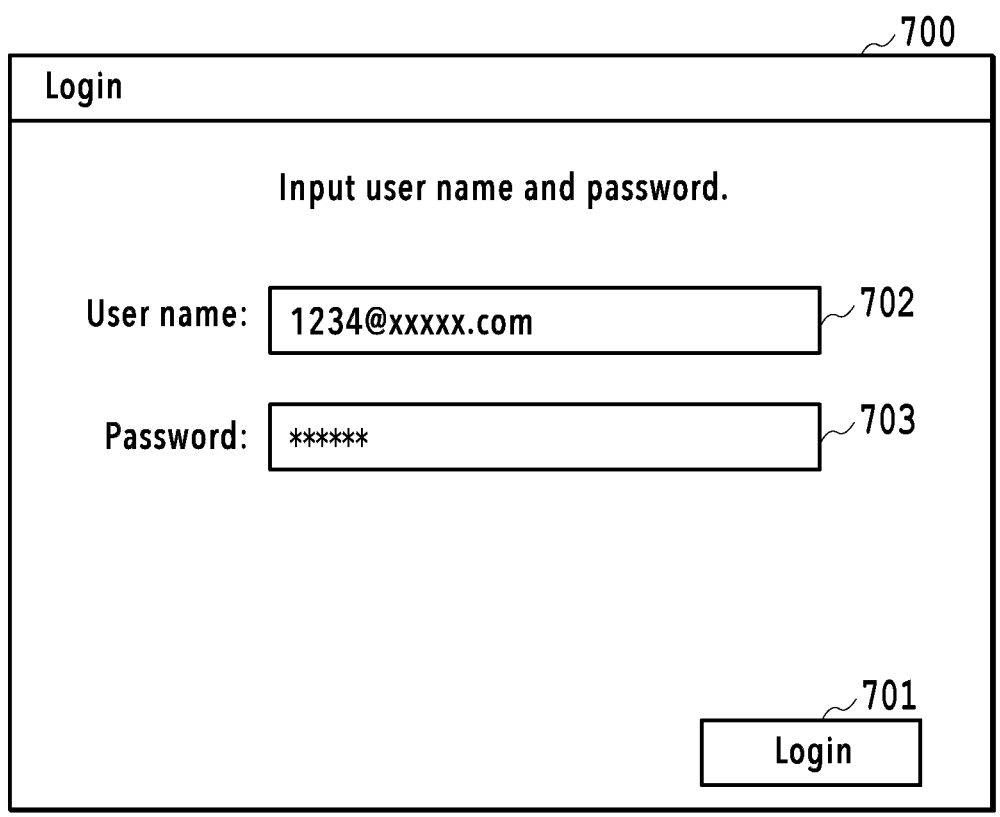
FIG. 7 is a diagram showing an example of a Login screen.

The MFP 110 displays a UI screen (hereinafter, described as "Login screen) on which to input information on log-in authentication for accessing the MFP cooperative server 120 on the operation unit 220 (S501). FIG. 7 shows an example of a Login screen. In a case where a user inputs a user ID and a password, which are registered in advance, in input fields 702 and 703, respectively, on a Login screen 700 and presses down a "Login" button 701, a request for log-in authentication is transmitted to the MFP cooperative server 120 (S502).

The MFP cooperative server 120 having received the request for log-in authentication performs authentication processing by using the user ID and the password, which are included in the request (S503). In a case where it is checked that the user is a genuine user by the results of the authentication processing, the MFP cooperative server 120 returns an access token to the MFP 110. After this, by sending this access token together at the time of the MFP 110 making various requests to the MFP cooperative server 120, a log-in user is specified. In the present embodiment, it is assumed that at the same time the login to the MFP cooperative server 120 is completed, the login to the settlement server 130 is also completed. Because of this, a user performs in advance association between the user ID for using the MFP cooperative service and the user ID for using the expense settlement service via a web browser or the like of the PC (not shown schematically) on the internet. Due to this, in a case where the log-in authentication to the MFP cooperative server 120 succeeds, the log-in authentication to the settlement server 130 is also completed at the same time and it is possible to omit the operation to log in to the settlement server 130. Then, it is made possible for the MFP cooperative server 120 to deal with a request relating to the expense settlement service from a user who has logged in to the MFP cooperative server 120. Generally, it is possible to perform the log-in authentication method by using a publicly known method (Basic authentication, Digest authentication, authentication using OAuth, and the like).

In a case where login is completed, the MFP 110 transmits an acquisition request for the proxy applicant list to the MFP cooperative server 120 along with the access token of the log-in user (S504). The proxy applicant list is name list information specifying a target person, who is a log-in user and can be a proxy applicant, in a case where a person other than the person who has received a receipt performs the receipt computerization work in the expense settlement service (proxy application). The proxy applicant list includes, for example, another user in a certain relationship with the log-in user, who is in the environment in which the same MFP 110 is used, such as a colleague in the department to which the log-in user belongs and the proxy applicant list is created in advance by, for example, a manager or the like. The MFP cooperative server 120 having received the acquisition request for the proxy applicant list transmits the acquisition request of the proxy applicant list of the log-in user specified by the access token to the settlement server 130 (S505). The settlement server 130 having received the acquisition request for the proxy applicant list reads the proxy applicant list of the log-in user and returns it to the MFP cooperative server 120. Then, the MFP cooperative server 120 transmits the proxy applicant list received from the settlement server 130 to the MFP 110. Due to this, the list information on "UserID" and "UserName" of a target person who is a log-in user and can be a proxy applicant as shown in FIG. 8 is acquired by the MFP 110. It may also be possible to transmit the proxy applicant list stored in the settlement server 130 to the MFP 110 as it is, or transmit it after changing the whole or a part of the format.

The MFP 110 having received the proxy applicant list displays a UI screen for setting an applicant (hereinafter, described as "Applicant setting screen") on the operation unit 220 (S506). FIG. 9 shows an example of an Applicant setting screen. In a selection field 902 on an Applicant setting screen 900, a list including the user names included in the proxy applicant list plus the user name of the log-in user him/herself is displayed in a pulldown menu as selection candidates. The log-in user selects the user name of him/herself in a case of performing the computerization work of a receipt received by the log-in user him/herself, or selects the user name of a proxy applicant in a case of performing the computerization work of a receipt received by a third person as a proxy applicant, and presses down a "Next" button 901.

Figure 10:
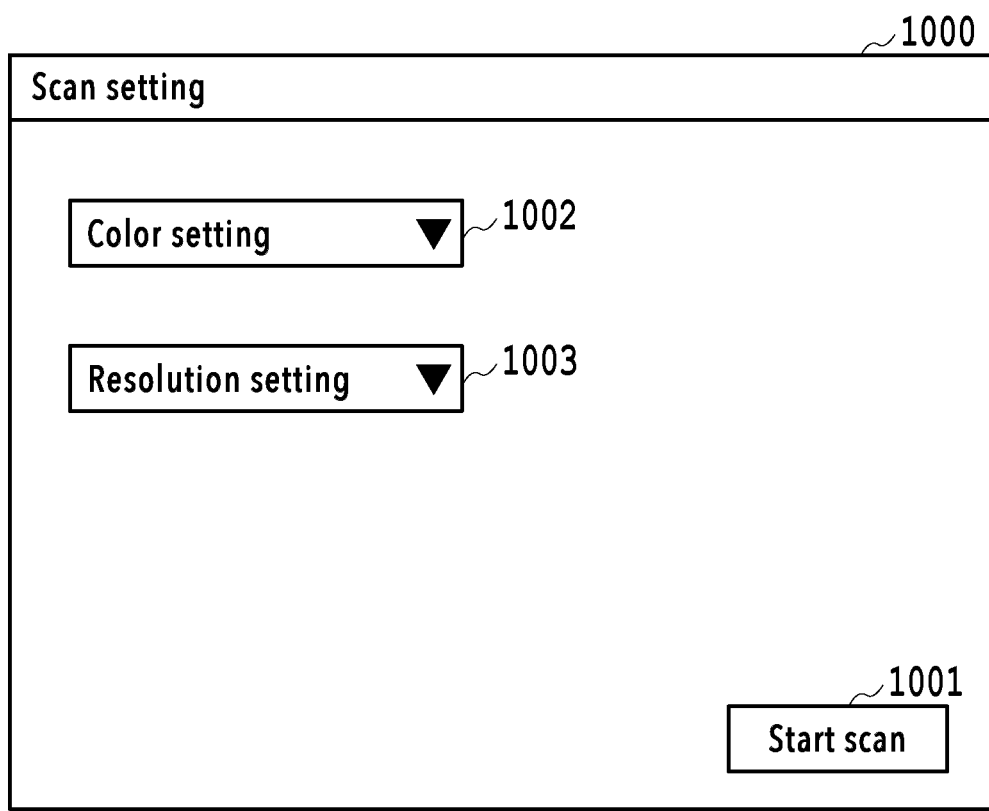
FIG. 10 is a diagram showing an example of a Scan setting screen.
Figure 11A:
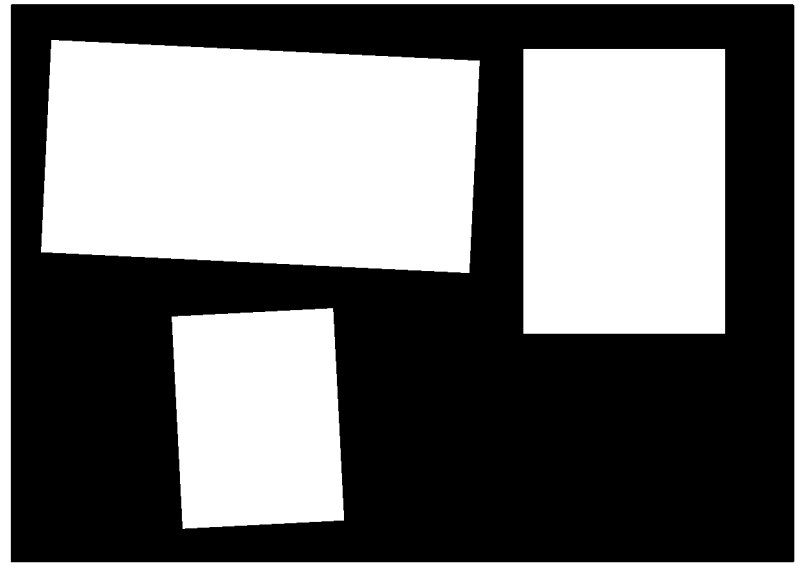
FIG. 11A and FIG. 11B are diagrams showing the way a plurality of receipts is scanned and FIG. 11A is a diagram showing a state where the receipts are placed with their surfaces facing downward and FIG. 11B is a diagram in a case where the receipts are viewed from inside a document table.
Figure 11B:
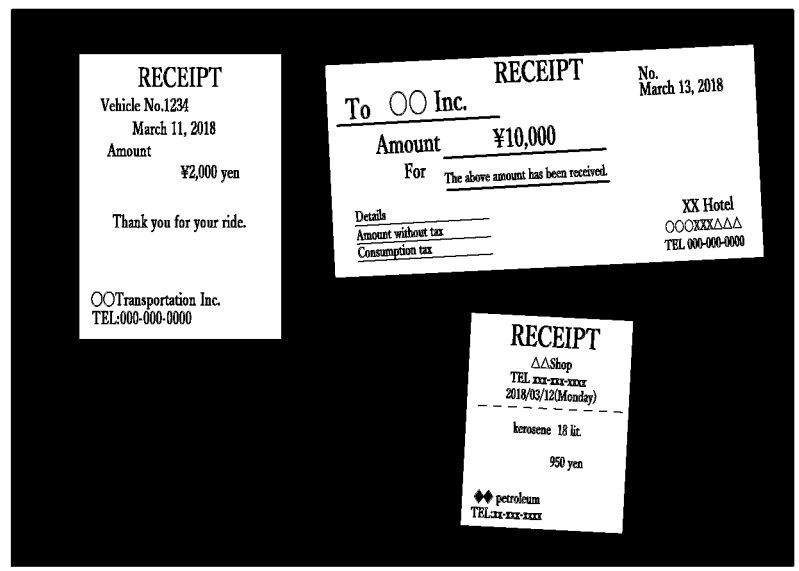

In a case where the "Next" button 901 is pressed down, a UI screen for scan setting (hereinafter, described as "Scan setting screen") is displayed on the operation unit 220 (S507). FIG. 10 shows an example of a Scan setting screen. On a Scan setting screen 1000, a "Start scan" button 1001, a Color setting field 1002, and a Resolution setting field 1003 exist. The "Start scan" button 1001 is a button for giving instructions to start scan processing for a document (in the present embodiment, a plurality of receipts) set on the document table. In the Color setting field, the color mode at the time of scan is set. For example, it is possible to specify one of alternatives, such as full color and monochrome. In the Resolution setting field 1003, the resolution at the time of scan is set. For example, it is possible to specify one of alternatives, such as 600 dpi and 1,200 dpi. The setting items of the color mode and the resolution are an example and it is not necessary for all of these setting items to exist, or another setting item other than those may exist. Further, it may also be possible to limit the alternatives relating to the color mode or the resolution only to the setting values required in the expense settlement service. A log-in user performs detailed condition setting as to the scan processing via the Scan setting screen 1000 such as this. In a case where a log-in user having completed the scan setting sets a scan-target receipt on the document table of the MFP 110 and presses down the "Start scan" button 1001, a scan is performed (S508). FIG. 11A and FIG. 11B are each a diagram showing the way three receipts are scanned and FIG. 11A shows a state where each receipt is placed on the document table with the read-target surface face down and FIG. 11B shows a state where the receipts are viewed from the inside of the document table. In this manner, a plurality of receipts is scanned at the same time. After the scan is completed, the MFP 110 transmits the image data obtained by the scan to the MFP cooperative server 120 along with an analysis request therefor (S509).

In the MFP cooperative server 120 having received the analysis request for the scanned image, the request control unit 431 instructs the image processing unit 432 to perform analysis processing (S510). At that time, the request control unit 431 returns a request ID capable of uniquely specifying the received analysis request to the MFP 110. FIG. 12A shows an example of the request ID. Then, the image processing unit 432 having received the instructions to perform analysis processing performs document recognition processing, which is part of the multi-cropping processing, as the analysis processing for the scanned image (S511). In the document recognition processing of the present embodiment, the document placed on the document table is detected by using two kinds of method, respectively. The two kinds of method are a method based on edge extraction processing and a method based on object detection processing and in a case of the present embodiment, the document area detected by the method based on edge extraction processing and the document area detected by the method based on object detection processing are in an exclusive relationship. In the following, detailed explanation is given.

In the document recognition processing of the present embodiment, first, document detection by the method based on edge extraction processing is performed and next, document detection by the method based on object detection processing is performed. The edge extraction processing is processing to specify the pixel portion corresponding to the edge of a document by using the luminance difference between adjacent pixels. In general, the surface of the side to be scanned of the document table cover (pressing plate) is white, and therefore, in a case where a scan is performed by covering the document table cover, depending on the thickness or the like of paper, there is a possibility that the edge of the receipt or the like does not appear in the scanned image. For this, there are measures that cause the edge of the document to be recognized on the scanned image by performing the scan with black paper covering on the scan-target document, such as a receipt, at the time of scan, or by performing the scan with the document table cover open. However, in a case where black paper is covered, it is necessary for a user to prepare the black paper and then cover the black paper each time the scan is performed, and therefore, this takes time and effort. Further, in a case where the scan is performed with the document table cover open, on a condition that the receipt is folded or bent, there is a possibility that the contents of the receipt itself are not seen clearly. Consequently, in the present embodiment, the document whose edge cannot be specified by the edge extraction processing is detected by the object detection processing. That is, the document area detected by the edge extraction processing is maintained as it is and among the residual areas whose document area is not detected by the edge extraction processing, the document area is detected by the object detection processing. By doing so, the detection accuracy is improved on the whole. In the object detection processing, first, the scanned image is binarized with a predetermined threshold value and an area whose size of a rectangle surrounding the set of black pixels (black pixel cluster) adjacent in the obtained binary image is larger than or equal to a predetermined value is specified as an object. Then, based on the arrangement of each object and the distance between the objects, a rectangular area including a cluster of objects (object group) having substantially the same inclination and located within a predetermined distance is determined as one document area. Further, in the document recognition processing of the present embodiment, the possibility (=possibility of division) that the document area detected by the object detection processing includes image areas corresponding to a plurality of documents is determined and determination of a predicted position in a case where division is performed is also performed and information on the determined division-predicted position is presented to a user. Details of the document recognition processing of the present embodiment will be descried later. The results of the document recognition processing are managed by the request control unit 431 along with the scanned image that is the target of the processing. At this time, the document area detected by the document recognition processing is saved in association with ImageID, which is a character string capable of uniquely identifying each document area. As regards this ImageID, it is necessary to prevent the same character string from being used in a redundant manner by, for example, attaching a serial number to a part of the character string. As regards this, there is a method of searching for an already-generated ImageID and allocating a character string that does not exist, or a method of generating and assigning UUID.

While the above-described analysis processing is being performed, the MFP 110 periodically (for example, every three seconds or the like) makes an inquiry about the processing situation to the MFP cooperative server 120 by using the above-described request ID (S512 to S512'). This inquiry is made repeatedly until the completion response of the analysis processing from the MFP cooperative server 120 is acquired (S513). Upon receipt of the inquiry about the processing situation, the MFP cooperative server 120 checks the progress situation of the analysis processing corresponding to the request ID. Then, in a case where the analysis processing is not completed, the MFP cooperative server 120 returns a response of "processing" (see FIG. 12B) indicating that the processing is in progress and in a case where the analysis processing is completed, returns a response of "completed" (see FIG. 12C) indicating completion. There is a case where the MFP cooperative server 120 returns a response of status information indicating a processing situation other than the processing situation in which the processing is in progress and the processing situation in which the processing is completed, such as "failed" in a case where the processing has failed. As shown in FIG. 12C, the response at the time of completion of the analysis processing includes results information on the document recognition processing as the scanned image analysis results, in addition to the status information. FIG. 12C shows results information on the document recognition processing for the scanned image obtained by scanning four receipts different from the example shown in FIG. 11A and FIG. 11B described previously. First, in "Status", the character string (completed) whose contents indicate completion is input. In "Images", three pieces of information, that is, "ImageID", "Accuracy", and "Points", corresponding to the number of detected document areas, are stored. "ImageID" is ID information identifying each detected document area. By specifying ImageID and transmitting an acquisition request to the MFP cooperative server 120, it is possible to acquire the image of a desired document area. "Accuracy" is accuracy information indicating the degree to which the document is detected correctly by a fractional number between 0.0 to 1.0. The accuracy information in the present embodiment indicates that the larger the value, the more correctly the document has been detected and in a case where the document is detected by the edge extraction processing, "Accuracy" is set to 1.0 and in a case where the document is detected by the object detection processing, "Accuracy" is set to 0.5. "Points" is coordinate information indicating at which position of the scanned image the document area is located. The coordinate information indicates each position of the top-left corner, the top-right corner, the bottom-right corner, and the bottom-left corner of each document area in order from the top-left corner with the top-left corner of the scanned image being taken as the origin (x, y)=(0, 0). "DivideCandidate" is information for dividing, in a case where there is a possibility that image areas corresponding to a plurality of documents are included within one detected document area, the document area into image areas in units of documents. In "DivideCandidate", there pieces of information, that is, "DivideID", "Point1", and "Point2" are included. First, "DivideID" is ID information identifying a document area predicted to be divided. "Point1" and "Point2" are each coordinate information indicating the start point and the end point, respectively, indicating the predicted division position.

Figure 13A:
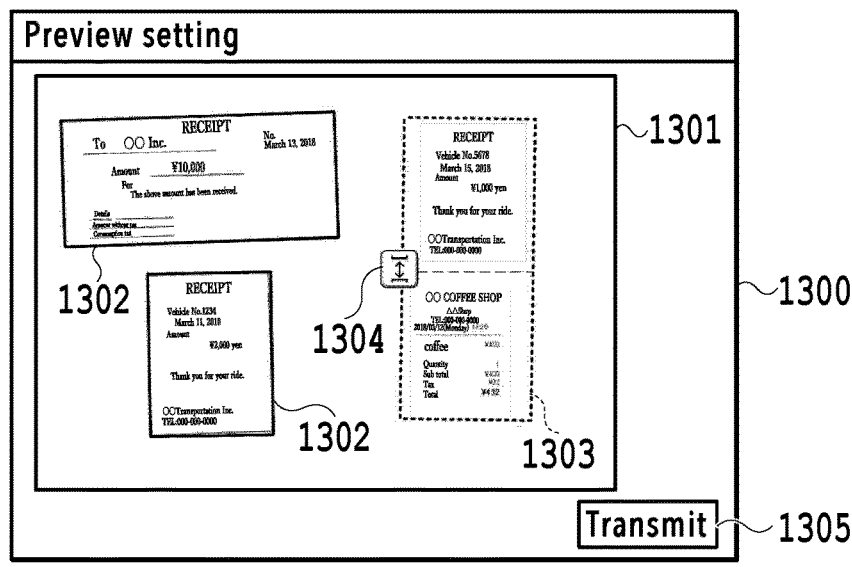
FIG. 13A to FIG. 13C are each a diagram showing an example of a Preview setting screen according to a first embodiment.
Figure 13B:
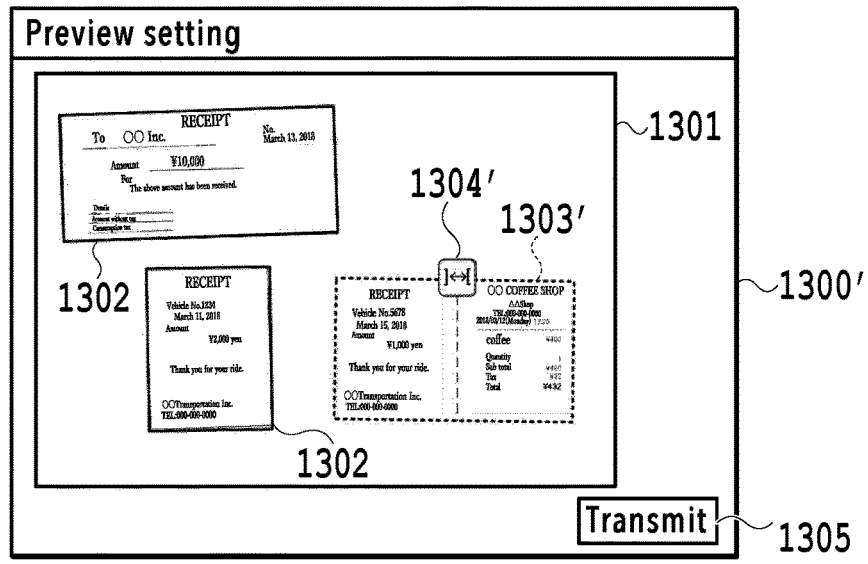

After receiving the completion response of the analysis processing, the MFP 110 displays a Preview setting screen indicating the recognition results of the document by the document recognition processing (S514). FIG. 13A FIG. 13B each show an example of a Preview setting screen that is displayed in a case where image areas corresponding to a plurality of receipts are detected as on document area. FIG. 13A is a case where image areas corresponding to two receipts arranged one on top of another are detected as one document area and FIG. 13B is a case where image areas corresponding to two receipts arranged side by side are detected as one document area. A user checks whether each document placed on the document table is recognized correctly on the Preview setting screen such as this. In a case where image areas of a plurality of documents (here, receipts) are included in one document area and modification to divide the document area is necessary, a user gives instructions to perform division on the Preview setting screen. In accordance with the division instructions of a user, the Preview setting screen is updated. Details of updating or the like of the Preview setting screen based on user instructions will be described later. In a case where a user having checked the recognition situation of the document on the Preview setting screen after updating presses down a "Transmit" button 1305 within the Preview setting screen shown in FIG. 13A and FIG. 13B, the MFP 110 transmits a registration request for the image corresponding to each document to the MFP cooperative server 120. At this time, in a case where the above-described division instructions have been given, prior to the registration request, a division request to divide one document area into a plurality of document areas is transmitted (S315). FIG. 14A shows an example of the division request and FIG. 14B shows an example of a response to the division request. As shown in FIG. 14A, in the division request, the information on "DivideID" included in the above-described completion response is included.

In the MFP cooperative server 120 having received the division request, the request control unit 431 calculates the coordinates of the image area in units of documents after division from the division position information associated with DivideID within the division request. Then, the request control unit 431 assigns ImageID newly to each document area after division and returns a response including the information on ImageID to the MFP 110. For example, for the division request in a case where the completion response as shown in FIG. 12C described previously is returned as the results of the document recognition processing, the following processing is performed.

First, by using the coordinate information on the document area of ImageID=image0003 and the coordinate information indicating the division position of DivideID=image0003-Divide0001, the document area specified by image0003 is divided into two document areas. Here, the document area is divided into a document area whose coordinates are "3011, 621, 3893, 623, 3890, 1542, 3010, 1537" and a document area whose coordinates are "3010, 1537, 3890, 1542, 3887, 2543, 3009, 2539". Then, for the two new document areas after division, ImageID of "image 0004" and ImageID of "image0005" are generated newly and coordinate information after division is saved in association with each ImageID. Then, a response storing information on ImageID (here, image0004 and image0005) corresponding to each generated document area after division is returned to the MFP 110. In a case where division instructions are not given by a user, the processing such as this based on the division request is not performed.

The MFP 110 having received the response including the information on the new ImageID after division transmits a document image registration request to the MFP cooperative server 120 subsequently (S516). FIG. 14C shows an example of the registration request. In this registration request, information on imageID corresponding to each registration-target document area is stored. In the example in FIG. 14C, four ImageIDs (image0001, image0002, image0004, image0005) corresponding to the four document areas after division are included. In a case where a user presses down the "Transmit" button 1305 without giving division instructions, a registration request including three ImageIDs (image0001, image0002, image0003) is transmitted.

In the MFP cooperative server 120 having received the registration request, the request control unit 431 acquires the information on the scanned image and the document area corresponding to ImageID included in the registration request and instructs the image processing unit 432 to cut out the document area (S517). Then, the image processing unit 432 having received the instructions performs processing to cut out the image for each document based on the information on the scanned image and the document area (S518). Due to this, the image (hereinafter, called "cropped image") in units of documents is generated, which corresponds to each of the plurality of documents placed on the document table. At the time of the cutout processing, in the image processing unit 432, after the image area in units of documents is cut out from the scanned image based on the coordinate information, processing to correct the inclination so that the side of each document becomes the horizontal or vertical state is also performed. Further, rotation processing to modify the direction is also performed as needed so that the orientation of the character of the document becomes the correct orientation by performing OCR processing and detecting the direction of the document contents. Then, the request control unit 431 transmits a registration request to the settlement server 130 along with the data on the cropped image obtained as described above (S519). In this manner, the image in units of receipts, which is cut out from the scanned image, is registered to the settlement server 130. Then, the response of registration completion is returned to the MFP 110 and the processing is terminated.

In the above-described explanation, for the division request at S515, the response storing the information on ImageID corresponding to each document area after division is returned only and the actual cutout processing is performed after the registration request. The reason for this is that the image corresponding to each document becomes necessary in the registration stage, and it may also be possible to perform the cutout processing also at the point in time of the division request. In this case, the cropped image obtained by the cutout processing is stored in advance in the MFP cooperative server 120 and in the stage of receiving the registration request, the stored cropped image is read and a request for registration processing thereof is made to the settlement server 130.

<Document Recognition Processing>

Figure 15:
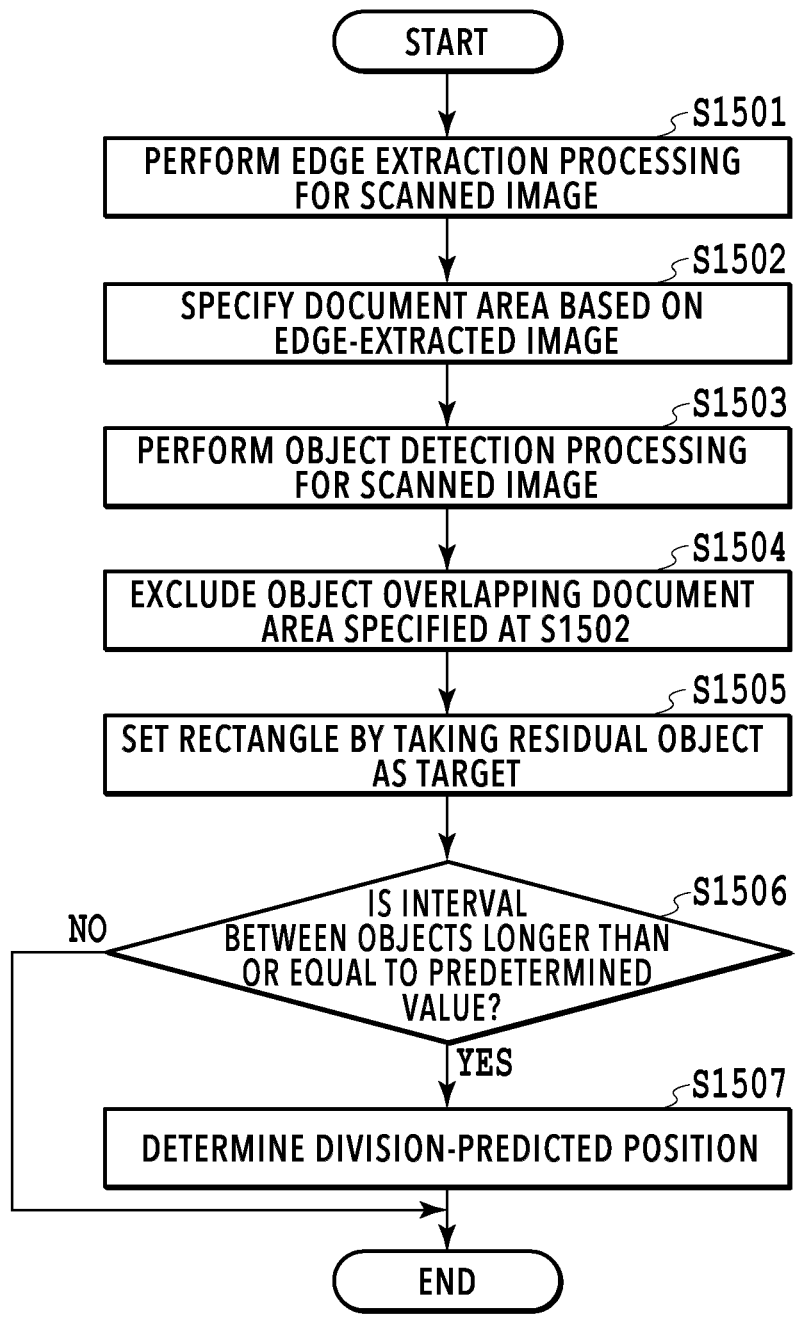
FIG. 15 is a flowchart showing details of document recognition processing.

Following the above, the document recognition processing as part of the multi-cropping processing, which is performed by the image processing unit 432 of the MFP cooperative server 120, is explained in detail. FIG. 15 is a flowchart showing details of the document recognition processing according to the present embodiment. The series of processing shown in the flow in FIG. 15 is implemented by the CPU 311 executing the control program stored in the HDD 314 and started by the analysis request (S509) described previously being received in the control unit 310 of the MFP cooperative server 120. Symbol "S" at the top of each piece of processing means a step.

Figure 16A:
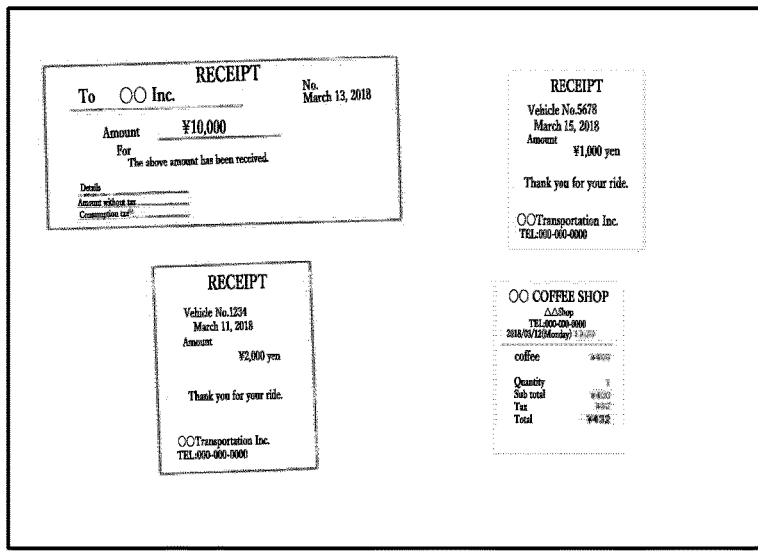
FIG. 16A is a diagram showing an example of a scanned image.
Figure 16B:
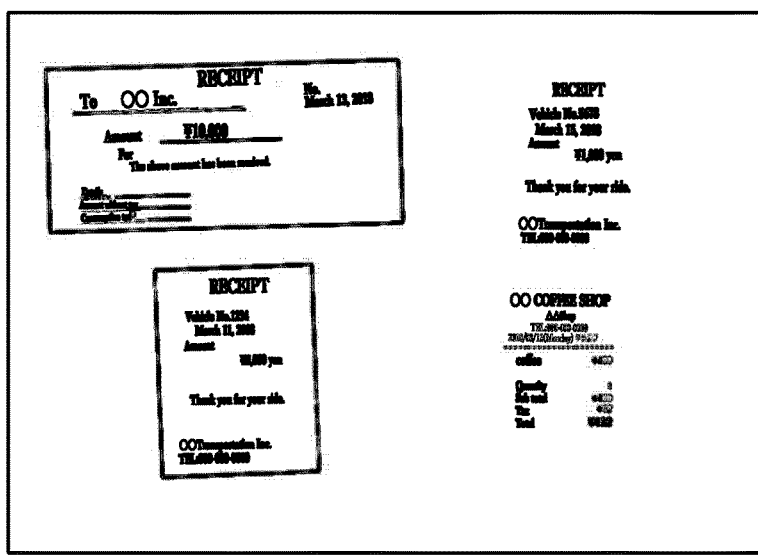
FIG. 16B is a diagram showing results of performing edge extraction processing for a scanned image.

At S1501, the edge extraction processing is performed for the input scanned image. For the edge extraction processing, it may be possible to use a publicly known method, for example, such as the Canny method. Here, explanation is given by using a specific example. FIG. 16A shows a scanned image that is input as a processing target. A scanned image 1600 is the same as the example shown in a preview area 1301 of a Preview setting screen 1300 in FIG. 13A described previously and is an image obtained by scanning four receipts placed on the document table. Here, in the scanned image 1600, as regards the two receipts on the left side, the edges of the documents are visible clearly, but the two receipts on the right side are in the state where the edges of the documents hardly appear. FIG. 16B shows the results of performing the edge extraction processing for the scanned image 1600. It is known that the edges of the two receipts on the left side are specified in an image (edge-extracted image) 1601 after the edge extraction processing in FIG. 16B, but the edges of the two receipts on the right side are not recognized.

Figure 16C:
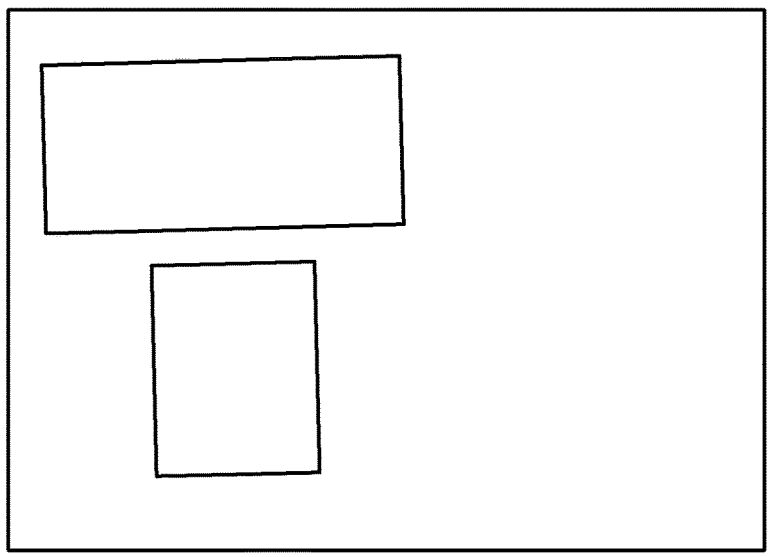
FIG. 16C is a diagram showing document areas specified in an edge-extracted image.

At S1502, the document area is specified based on the edge-extracted image. Specifically, straight line components are determined among extracted edges by performing the Hough transform or the like and rectangular areas whose angle formed by the straight lines is close to the right angle are found, and then, a rectangular area whose lengths of the vertical side and the horizontal side are longer than or equal to a predetermined amount is specified as the document area. In this case, it may be possible to determine the "predetermined amount" by taking into consideration the size of the scan-target document, for example, 4 cm for both the vertical and the horizontal sides. FIG. 16C shows the document areas specified in the edge-extracted image 1601 in FIG. 16B. In this example, the two document areas corresponding to the two receipts on the left side in the scanned image 1600 are specified.

Figure 17A:
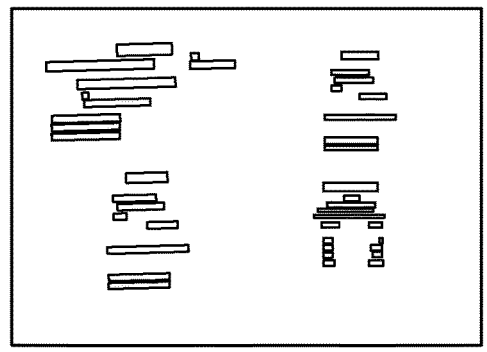
FIG. 17A to FIG. 17E are diagrams explaining detection of a document area based on object detection processing.

At S1503, the object detection processing is performed for the input scanned image. FIG. 17A shows the results of performing the object detection processing for the scanned image in FIG. 16A described previously. It is known that the character string portion described on each of the four receipts is detected as an object.

Figure 17B:
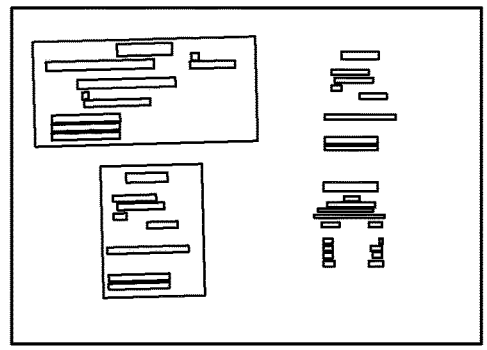

At S1504, processing to exclude the object having the area that overlaps even partially the document area specified at S1502 among the objects detected at S1503 is performed. FIG. 17B is a diagram showing both the document areas specified at S1502 and the objects detected at S1503 in an overlapping manner. It is known that by the exclusion processing at this step, the objects corresponding to the character strings of the two receipts on the left side already specified as the document area are deleted ant only the objects corresponding to the character strings of the two receipts on the right side are left.

Figure 17C:
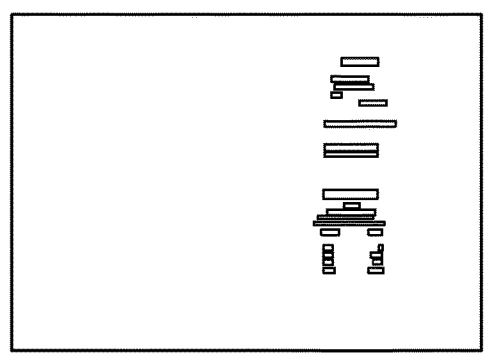
Figure 17D:
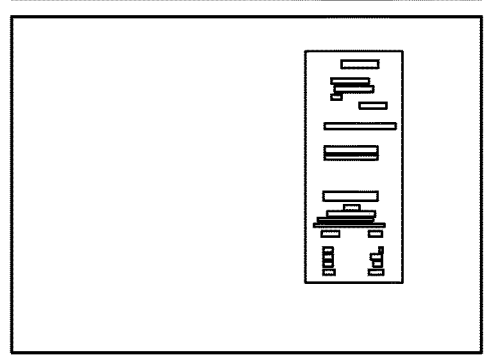

At S1505, a rectangle including one cohesive object group is set by performing grouping by taking the objects that are left after exclusion (hereinafter, called "residual objects") as a target. For example, the mode of the angle each of the residual objects has is found and based on the found mode of the angle, a rectangle circumscribing a cohesive object group is set. Alternatively, a one-size larger rectangle is set, whose top, bottom, left, and right sides of the circumscribed rectangle including the object group are given a predetermined margin. In a general document, such as a receipt and a business card, a blank area exists. Because of this, in a case where cutting out is performed with a circumscribed rectangle whose sides are very close to the outer edges of the object group, there is a possibility that the edge portion of the document is cut away, and therefore, it is desirable to give a margin at the time of setting a rectangle. FIG. 17D shows a rectangle that is set so as to include the residual objects shown in FIG. 17C. In a case where an object group each having a different angle exists among the residual objects, objects having substantially the same angle are grouped and a rectangle is set for each obtained group. Further, it may also be possible to provide a threshold value for the number of objects as the condition at the time of setting a rectangle and not to set a rectangle (not to handle as a document area) in a case where the number of objects is less than the threshold value. Furthermore, it may also be possible to provide a threshold value for the area of a rectangle and not to set a rectangle in a case where the size is less than the threshold value.

At S1506, for the rectangle (in a case where a plurality of rectangles is set, for each rectangle) set at S1505, whether the interval between adjacent objects, which exist in the set rectangle, is longer than or equal to a predetermined value is determined. By this determination processing, whether image areas corresponding to a plurality of documents are included in the one document area detected by the object detection processing is determined. Specifically, first, straight lines parallel to the horizontal side of the set rectangle and whose length is the same are checked in the vertical direction of the document area, and straight lines parallel to the vertical side of the set rectangle and whose length is the same are checked in the horizontal direction of the document area, respectively, and a "line on which no object exists" is found. At this time, between the edge of the rectangle and the portion at which the first object exists is an area corresponding to the blank of the document, and therefore, this is not handled as a "line on which no object exists". Then, in a case where a "line on which no object exists" is found, how long the line continues, that is, how many pixels the length corresponds to are checked and on a condition that the line continues by a predetermined number of pixels or more, it is determined that the interval between adjacent objects is longer than or equal to the predetermined value. At this time, it may also be possible to set the predetermined number of pixels corresponding to the interval longer than or equal to the predetermined value to the number of pixels corresponding to a fixed value, for example, such as 3 cm, or determine it based on the average value or the like of the sizes of objects. In the example in FIG. 17D described previously, in a case where a line parallel to the vertical side is checked in the horizontal direction, a "line on which no object exists" does not exist. In a case where a line parallel to the horizontal side is checked in the vertical direction, a "line on which no object exists" exists at 17 portions. In a case where the angle of the object is inclined, a "line on which no object exists" is checked in a direction in accordance with the angle. As described above, whether the interval between adjacent objects in the direction perpendicular to the line on which no object exists within the set rectangular area is longer than or equal to the predetermined value is determined. In a case where the results of the determination indicate that the interval between adjacent objects is longer than or equal to the predetermined value (that is, in a case where it is determined that image areas corresponding to a plurality of documents are included in one detected document area), the processing advances to S1507. On the other hand, in a case where the interval is not longer than or equal to the predetermined value, this processing is terminated.

Figure 17E:
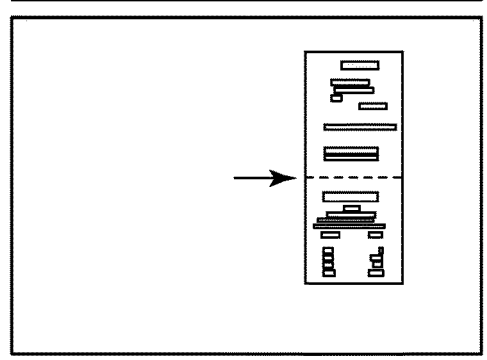

At S1507, the division-predicted position for the document area specified by the rectangle set at S1505 is determined. Specifically, the middle position of the line group including the "lines on which no object exists" that continue by the predetermined number of pixels or more is determined as the division-predicted position. FIG. 17E shows the division-predicted position in a case of FIG. 17D by an arrow and a broken line. The coordinate data indicating the division-predicted position thus determined is returned from the MFP cooperative server 120 to the MFP 110 as "DivideCandidate" in the response at the time of analysis completion. In this example, only one division-predicted position is determined, but in a case where a plurality of line groups including the "lines on which no object exists" that continue by the predetermined number of pixels or more is found, a plurality of division-predicted positions is determined. The methods of the edge extraction processing at S1501 and the object detection processing at S1503 are not limited in particular and it may be possible to apply a publicly known method.

The above is the contents of the document recognition processing according to the present embodiment. In this flow, the object detection processing is performed for the whole of the scanned image, but it may also be possible to perform the object detection processing for the residual area for which no document area is detected by the edge extraction processing. At that time, it may also be possible to perform the object detection processing only in a case where the size of the residual area is larger than or equal to a predetermined value by taking into consideration the scan-target document size. In a case where the target area of the object detection processing is limited to a part of the scanned image as described above, it is possible to omit the object exclusion processing at S1504 described previously.

<Processing Details of MFP>

Figure 18:
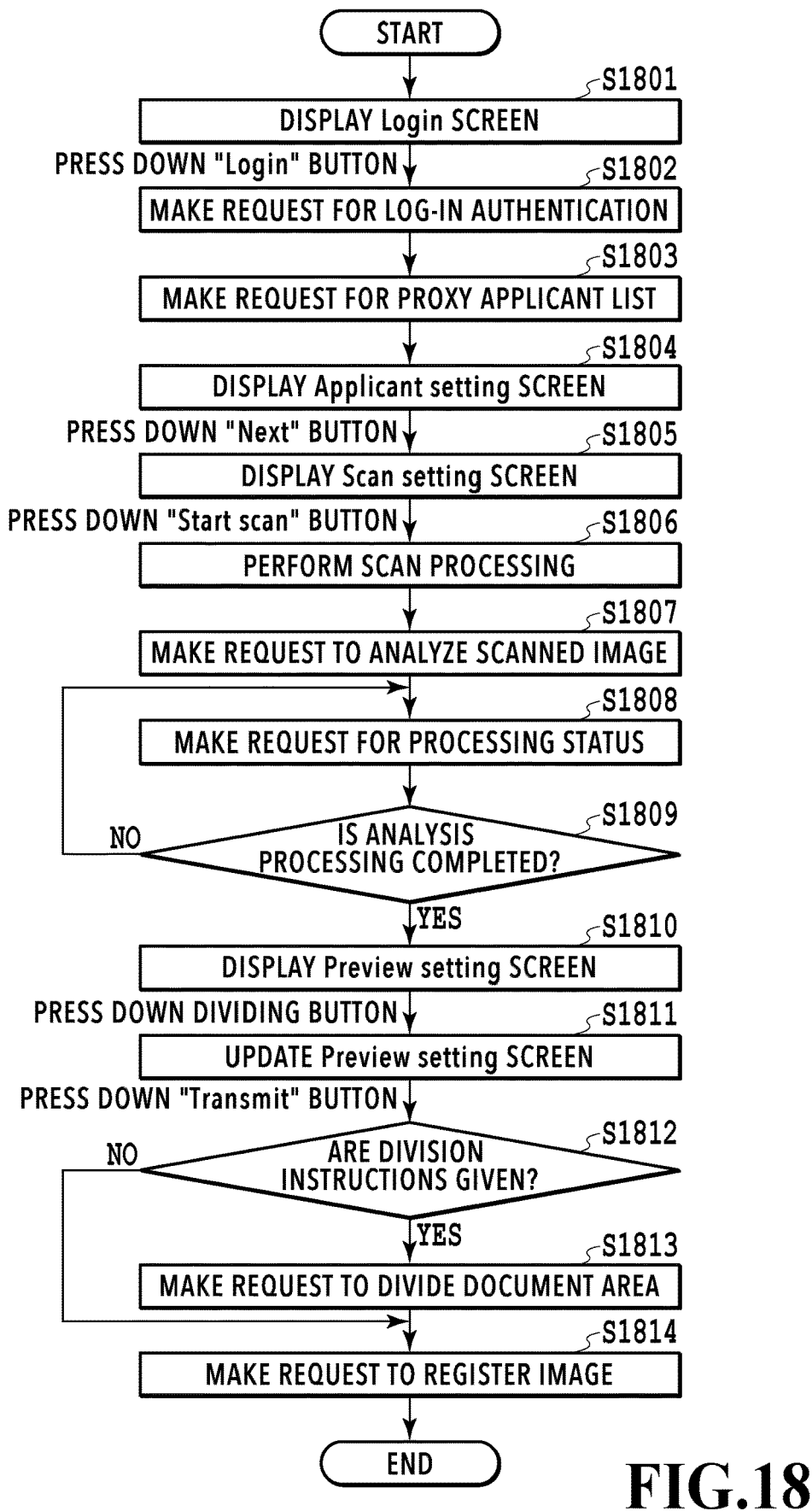
FIG. 18 is a flowchart showing a flow of expense settlement processing in an MFP.

Following the above, by focusing attention on the operation in the MFP 110, the processing in a case where expense settlement is performed in the image processing system described above is explained in detail. FIG. 18 is a flowchart showing a flow of the expense settlement processing in the MFP 110. This series of processing is implemented by the CPU 211 executing the control program stored in the HDD 214 and started in response to the pressing down of the "Settle expense" button 601 on the Main screen 600 described previously in the control unit 210. In the following, detailed explanation is given along the flowchart shown in FIG. 18. Symbol "S" at the top of each piece of processing means a step.

A S1801, the display control unit 421 displays the Login screen 700 described previously. In a case where a user name and a password are input in the input fields 702 and 703, respectively, on the Login screen 700 and the pressing down of the "Login" button 701 is detected, the processing advances to S1802.

At S1802, the cooperative service request unit 423 transmits a log-in authentication request to the MFP cooperative server 120. In a case where it is checked that the user is a genuine user by the log-in authentication in the MFP cooperative server 120, the cooperative service request unit 423 receives the access token from the MFP cooperative server 120.

The cooperative service request unit 423 having received the access token transmits an acquisition request for the proxy applicant list to the MFP cooperative server 120 along with the access token at S1803. Then, upon receipt of the proxy applicant list from the settlement server 130 via the MFP cooperative server 120, the cooperative service request unit 423 delivers it to the display control unit 421.

At S1804, the display control unit 421 displays the Applicant setting screen 900 described previously based on the received proxy applicant list on the display unit 220. At this time, in the selection field 902 on the Applicant setting screen 900, the user name of the log-in user him/herself is displayed as the initial value and in a case where the "Next" button 901 is pressed down without selecting a proxy applicant, the user registers receipt images to the expense settlement service and so on as the application by the user him/herself. In a case where a user name is selected by the log-in user and the pressing down of the "Next" button 901 is detected, the processing advances to S1805. In a case where no user name exists in the proxy applicant list (no contents in the list), this step itself is skipped.

At S1805, the display control unit 421 displays the Scan setting screen 1000 described previously on the operation unit 220. In a case where a receipt is set on the document table by the log-in user and the pressing down of the "Start scan" button 1001 is detected, the display control unit 421 notifies the scan control unit 422 of that.

The scan control unit 422 having received the notification instructs the scan execution unit 411 to perform scan processing. Upon receipt of the instructions, the scan execution unit 411 scans the receipt placed on the document table. The scanned image data generated by the scan is saved in the image data save unit 412 and the display control unit 421 is notified of an identifier capable of specifying the scanned image. At this time, it may also be possible to display a message screen (not shown schematically) indicating that the scan is in progress on the display unit 220.

Next, at S1807, the cooperative service request unit 423 acquires the scanned image data via the display control unit 421 and transmits it to the MFP cooperative server 120 along with the analysis request therefor. Based on the analysis request, in the MFP cooperative server 120, the multi-cropping processing described previously is performed for the received scanned image data. At that time, a request ID is returned from the request control unit 431 of the MFP cooperative server 120.

The cooperative service request unit 423 having acquired the request ID transmits an acquisition request for the processing status to the MFP cooperative server 120 along with the request ID at S1808. Based on the acquisition request, the MFP cooperative server 120 returns a response in accordance with the progress situation of the multi-cropping processing specified by the request ID.

At S1809, the cooperative service request unit 423 returns to S1808 in a case where the response received from the MFP cooperative server 120 is the contents indicating that the processing is in progress (see FIG. 12B). Then, after a predetermined time (for example, about several seconds) elapses, the cooperative service request unit 423 transmits the acquisition request for the processing status to the MFP cooperative server 120 again. In a case where the received response is the contents indicating completion (see FIG. 12C), the processing advances to S1810.

At S1810, the display control unit 421 displays the Preview setting screen 1300 described previously on the operation unit 220. Here, with reference to FIG. 13A described previously, the Preview setting screen is explained in detail. Here, in the preview area 1301 on the Preview setting screen 1300, a first detection frame 1302 indicated by a solid line and a second detection frame 1303 indicated by a broken line are displayed. The first detection frame 1302 corresponds to the document area specified based on the edge extraction processing and the accuracy with which the detection frame represents the outer edge of the document is high. On the other hand, the second detection frame corresponds to the document area specified based on the object detection processing and the accuracy with which the detection frame represents the outer edge of the document is lower than that of the first detection frame. These first detection frame 1302 and second detection frame 1303 are generated in the image processing unit 424 based on the analysis information (results information on the document recognition processing) included in the completion response and displayed on the scanned image in an overlapping manner. The first detection frame 1302 is generated by using the coordinate information indicated by Points for the document area whose Accuracy is 1.0 among the document areas specified by each ImageID. Further, the second detection frame 1303 is generated by using the coordinate information indicated by Points of the image area whose Accuracy is 0.5. Then, both the detection frames are displayed in different display aspects (for example, the line width, the color, or the like of the frame is made to be different) so that a user can identify the difference between both by their appearances. Then, in a case where it is predicted that the document area on which the second detection frame 1303 is displayed in an overlapping manner is divided, a button for a user to give instructions to divide the document area into a plurality of document areas (hereinafter, called "dividing button") is displayed. This dividing button is arranged so as to indicate the above-described division-predicted position so that it is possible for a user to intuitively recognize at which position the document area should be divided. Further, it may also be possible to add information indicating the division direction to the dividing button. In the present embodiment, a double arrow indicating the division direction is displayed within the dividing button. In the example in FIG. 13A, a dividing button 1304 is displayed on the side of the second detection frame 1303 and on the line connecting the coordinate position of Point1 and the coordinate position of Point2, which are included in DivideCandidate within the completion response. Then, in the present embodiment, the dividing button 1304 is arranged so that the coordinate position of Point1 indicating the start point of the division-predicted position is located at the center thereof. However, the position of the dividing button 1304 is not limited to this and it may be possible to arrange the dividing button 1304 at an arbitrary position at which it is possible for a user to recognize at which position the document area should be divided, such as on the line connecting the coordinate position of Point1 and the coordinate position of Point2 and in the vicinity thereof. Further, as shown on the Preview setting screen 1300 in FIG. 13A, in a case where the line connecting the coordinate position of Point1 and the coordinate position Point2 extends in the horizontal direction, a line indicating the border after division is displayed so that division is performed in the vertical direction. Furthermore, as shown on a Preview setting screen 1300' in FIG. 13B, in a case where the line connecting the coordinate position of Point1 and the coordinate position of Point2 extends in the vertical direction, a line indicating the border after division is displayed so that division is performed in the horizontal direction. Still furthermore, it may also be possible to display the dividing button 1304 in accordance with the inclination (angle) of the rectangle representing the second detection frame 1303.

Figure 13C:
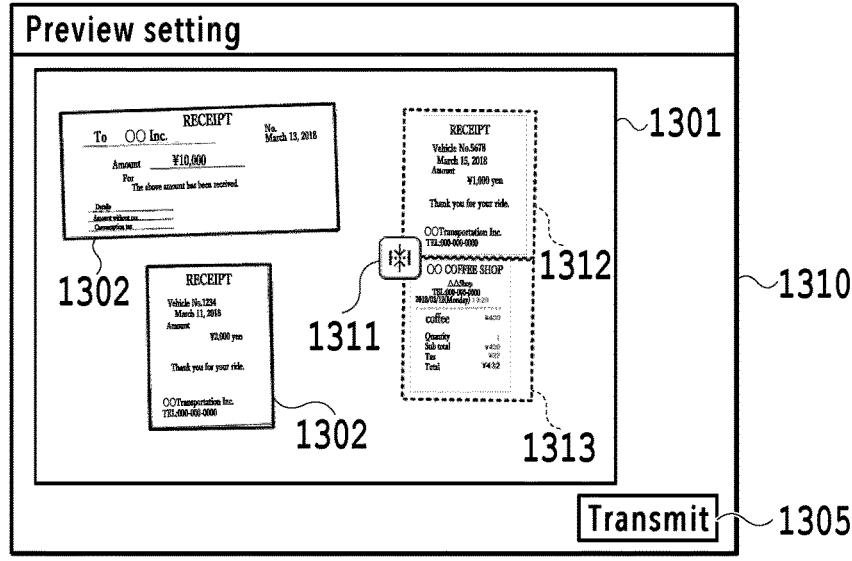

In a case where the dividing button 1304 (or 1304') is pressed down by a user, at S1811, the display control unit 421 updates the Preview setting screen based on the information on DivideCandidate included in the completion response. A Preview setting screen 1310 in FIG. 13C shows the state after updating of the Preview setting screen 1300 in FIG. 13A. On the Preview setting screen 1310 after updating, the second detection frame 1303 is divided horizontally into two frames, that is, separated into a frame 1312 corresponding to the upper document and a frame 1313 corresponding to the lower document. Further, at the position at which the dividing button 1304 was displayed, a combining button 1311 is displayed. It is possible for a user to return the two frames 1312 and 1313 displayed on the Preview setting screen 1310 after updating to the original second detection frame 1303 by pressing down this combining button 1311. That is, by using the combining button 1311, it is possible for a user to cancel the operation even in a case of erroneously pressing down the dividing button 1304. A user checks the recognition state of each document on the Preview setting screen 1310 such as this after updating and presses down the "Transmit" button 1305 in a case where there is no problem.

In a case where a use presses down the "Transmit" button 1305, at S1812, the processing is branched according to whether division instructions are given (whether the dividing button 1304 is pressed down at that point in time). In a case where division instructions are given, the processing advances to S1813. On the other hand, in a case where division instructions are not given, S1813 is skipped and the processing advances to S1814.

At S1813, the cooperative service request unit 423 transmits the division request described previously to the MFP cooperative server 120. In the MFP cooperative server 120 having received the division request, the request control unit 431 determines the document area after division in a case where division is performed for the division-target document area in accordance with the coordinate information indicating the division position based on DivideID within the division request. Then, to each document area after division, ImageID uniquely indicating each document area is assigned. Then, a response including information on ImageID assigned to each document area after division is returned to the MFP 110.

At S1814, the cooperative service request unit 423 transmits a registration request to the MFP cooperative server 120. As described previously, in the registration request, ImageID indicating the document area in the scanned image of the registration-target image (here, receipt image) in units of documents is included. In the MFP cooperative server 120 having received the registration request, processing for registering the receipt image to the settlement server 130 is performed. Specifically, first, the request control unit 431 acquires the coordinate information for cutting out the document area from the scanned image based on ImageID within the registration request and instructs the image processing unit 432 to perform cutout processing of the receipt image. The image processing unit 432 having received the instructions generates the receipt image to be registered to the settlement server 130. Then, the expense settlement request unit 433 acquires the information on the user of the settlement server 130, which is associated with the access token, and transmits the registration request to the settlement server 130 after associating the registration request with the user information. In the settlement server 130 having received the registration request, the expense information management unit 442 performs registration processing of the receipt image based on the instructions of the request control unit 441. Then, the request control unit 441 returns a response in which the character string of "completed" indicating the registration completion is stored in Status to the MFP cooperative server 120. This response of registration completion is returned to the MFP 110 via the request control unit 431 of the MFP cooperative server 120.

The above is the contents of the expense settlement processing in a case where attention is focused on the operation in the MFP 110 according to the present embodiment.

Modification Example

In the above-described embodiment, in a case where division is performed, it may also be possible to store information on the interval between objects adjacent to the division position and the like in association with a user who has given the division instructions. In this case, it is possible to display the state after the dividing button 1304 is pressed down automatically by referring to the stored history information at the time of the same user logging in next time and later. Due to this, it is possible to eliminate time and effort of a user and the convenience improves.

Further, it may also be possible take the state in FIG. 13C as the initial display state of the Preview setting screen in place of the state in FIG. 13A. That is, in the stage in which the Preview setting screen is displayed first, it may also be possible to display the second detection frame 1303 in the state of being divided into the two frames 1312 and 1313 based on the division-predicted position and further display the combining button 1311 at the position at which the division has been performed.

Second Embodiment

Figure 19A:
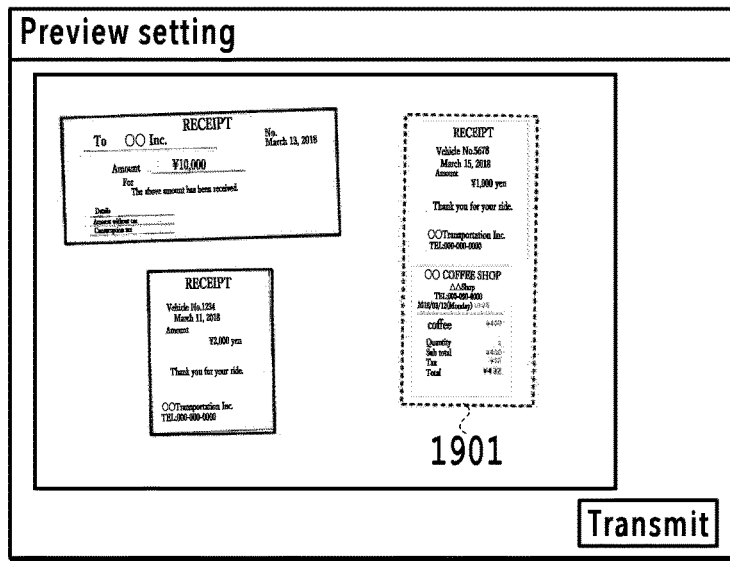
FIG. 19A to FIG. 19C are each a diagram showing an example of a Preview setting screen according to a second embodiment.

In the first embodiment, the division-predicted position at the time of displaying the dividing button on the Preview setting screen is determined based on the interval between adjacent objects in the document recognition processing (see S1507 in the flowchart in FIG. 15). Because of this, in a case where the interval between two documents arranged side by side or one on top of another is not longer than or equal to a predetermined value (in a case where No at S1506), the dividing button is not displayed on the Preview setting screen. FIG. 19A shows an example of the Preview setting screen on which the dividing button is not displayed. On a Preview setting screen 1900 in FIG. 19A, the interval between two receipts arranged one top of another is short, and therefore, the dividing button is not displayed in a second detection frame 1901.

Consequently, an aspect is explained as a second embodiment in which it is possible for a user to perform division of a document area at an arbitrary position even in a case where the Preview setting screen in the state in FIG. 19A is displayed. The basic configuration, such as the system configuration, is in common to that of the first embodiment and there is no difference in particular, and therefore, in the following, the characteristic configuration of the present embodiment, that is, the operation and the processing for a user to display the dividing button at a desired position are explained mainly.

Figure 19B:
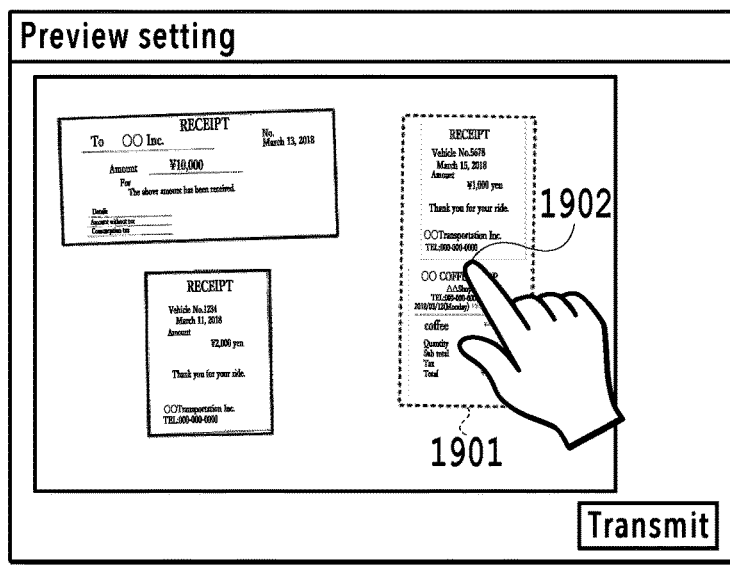

Here, at S1810 in the flowchart in FIG. 18 explained in the first embodiment, it is assumed that the initial display state of the Preview setting screen displayed on the operation unit 220 of the MFP 110 is the state in FIG. 19A described previously. In the present embodiment, it is made possible for a user to specify a position at which a user desires to divide the document area (that is, a position at which a user desires to display the dividing button) in the state such as this. As the specification method, for example, in a case where the operation unit 220 has the touch panel function, a user is caused to perform the touch operation to an arbitrary position within the second detection frame 1901 on the Preview setting screen 1900. FIG. 19B is a diagram showing the way the touch operation using his/her finger 1902 of the user is performed on the Preview setting screen 1900. The intention of the user in this case is to specify the division position at which the document area corresponding to the second detection frame 1901 is divided vertically into two document areas so that images corresponding to each of two receipts arranged one on top of another are obtained. The Preview setting screen may be updated with this touch operation as a trigger and from this point of view, it can be said that the touch operation here corresponds to the pressing down of the dividing button in the first embodiment. It may also be possible to perform the specification of the division position by a user with a mouse or the like. In a case where the display control unit 421 detects the touch operation such as this by a user, the cooperative service request unit 423 transmits a request (hereinafter, called "division determination request") to check whether it is possible to divide the document area at the position specified by a user to the MFP cooperative server 120. FIG. 20A shows an example of the division determination request. "Divide-Point" included in the division determination request is the coordinate information on the position specified by a user.

In the MFP cooperative server 120 having received the division determination request, the request control unit 431 acquires the coordinate information on DividePoint and determines whether it is possible to divide the document area at the position specified by the coordinate information. Specifically, first, the mode of the angle of each object within the second detection frame including the position specified by a user is found. Then, in accordance with the angle, which is the mode, straight lines are extended in the vertical direction and in the horizontal direction from the position specified by a user and whether an object exists on the respective straight lines is checked. Then, in a case where an object does not exist on the straight line in one of the directions, it is determined that division is possible in that direction and a response including the coordinate information on the intersections of the straight line on which no object exists and both edges of the second detection frame is returned to the MFP 110. In a case where an object does not exist in neither one of the directions, which interval between objects is longer between in vertical direction and in the horizontal direction is determined. Then, in a case where the interval between objects is longer in the vertical direction, it is determined that division is possible in the horizontal direction and a response including the coordinate information on the intersections of the line extending in the horizontal direction from the position specified by a user and both the edges of the second detection frame is returned to the MFP 110. On the other hand, in a case where the interval between objects is longer in the horizontal direction, it is determined that division is possible in the vertical direction and a response including the coordinate information on the intersections of the line extending in the vertical direction from the position specified by a user and both the edges of the second detection frame is returned to the MFP 110. Then, in a case where an object exists on the straight lines in both the directions, it is determined that division of the document area is not possible at the position specified by a user and a response storing a character string (error) indicating that division is not possible in "Status" is returned. FIG. 20B is an example of the response to the division determination request and shows a response in a case where it is determined that division is possible at the position specified by a user in the example in FIG. 19B. The contents stored in "Images" are the same as those of the response at the time of analysis processing completion shown in FIG. 12C except for that a character string (succeeded) indicating that division is possible is stored in "Status". It is a matter of course that the position specified by the coordinate information on Point1 and Point2 in this case is the above-described coordinate position in a case where it is determined that division is possible.

Figure 19C:
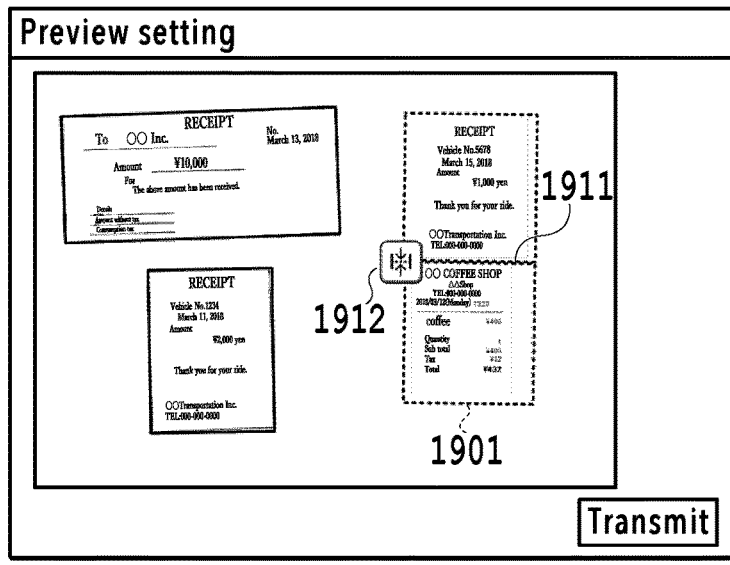

In the MFP 110 having received one of the above-described responses to the division determination request, the display control unit 421 updates the Preview setting screen 1900 based on the information included in the received response (S1811). A Preview setting screen 1910 in FIG. 19C shows the state after updating of the Preview setting screen 1900 in FIG. 19A. On the Preview setting screen 1910 after updating, a division line 1911 at the time of dividing the document area corresponding to the second detection frame 1901 vertically into two document areas is displayed. Further, a combining button 1912 for cancelling the division is displayed. The subsequent processing is the same as that of the first embodiment, and therefore, explanation is omitted.

The above is the flow of the expense settlement processing in the MFP 110, which corresponds to a case where the dividing button is not displayed on the Preview setting screen.

Modification Example

In the present embodiment, in a case where division is performed in accordance with the touch operation or the like of a user, it is also possible to store the information on the interval between objects adjacent to the division position in association with a user who has given the division instructions. Then, at the time of the same user logging in next time and later, the stored history information is referred to and in a case where the interval between objects is longer than or equal to the interval at the time of division by the touch operation of the previous time, the dividing button is displayed automatically. Due to this, it is possible to eliminate time and effort of a user and convenience improves.

Third Embodiment

As described in explanation of the flowchart in FIG. 15 of the first embodiment, in the setting of the rectangle at the time of specifying the document area by the object detection processing, it is desirable to give a margin by taking into consideration the blank of the document. However, even in a case where a margin is given, depending on the document, a blank larger than or equal to the prepared margin exists, and therefore, there is a possibility that the document is not included in the set rectangle (=second detection frame). Consequently, an aspect is explained as a third embodiment in which it is made possible for a user to adjust each side of the second detection frame displayed on the Preview setting screen.

Figure 21:
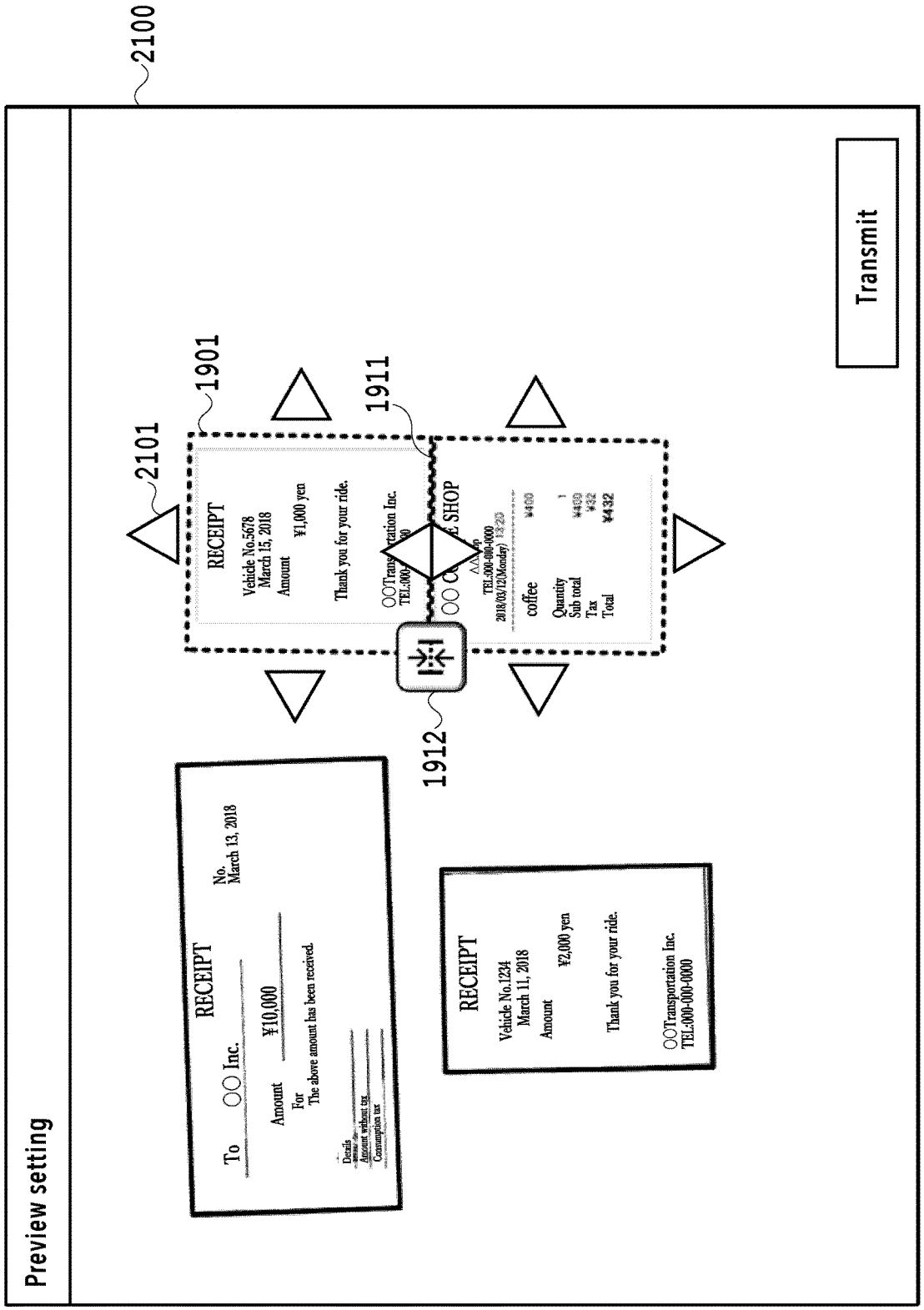
FIG. 21 is a diagram showing an example of a Preview setting screen according to a third embodiment.

FIG. 21 is a diagram showing an example of a Preview setting screen according to the present embodiment, which is based on the Preview setting screen 1910 after updating shown in FIG. 19C of the second embodiment. In the vicinity of each side of the second detection frame 1901 (in this example, near the center of each side), an adjusting button 2101 for changing the position of the side is displayed. This adjusting button 2101 is displayed in response to, for example, the touch operation to the second detection frame 1901, the pressing down of a dedicated button, not shown schematically, and the like. A user adjusts the position of the side so as to fit to the size of the document by operating the adjusting button 2101 corresponding to each side (for example, drag and drop). On a Preview setting screen 2100 in FIG. 21C, not only to the side of the second detection frame 1901, but alto to the division line 1911, the adjusting button 2101 is provided so that it is also possible to fine-adjust the division position. In a case where the division position is changed by the adjusting button 2101, the position of the dividing button 1912 changes accordingly. In a case where the position of the side of the second detection frame and the division position are adjusted by using the adjusting button 2101, in the registration request described previously, in addition to the information on ImageID, information on the coordinates of the four points indicating the outer edge of each document area after adjustment is also stored. FIG. 14D shows an example of the registration request according to the present embodiment.

In the MFP cooperative server 120 having received the above-described registration request, the request control unit 431 obtains images in units of documents by performing cutout processing of the image area corresponding to each document from the scanned image by using the coordinate information included in the registration request.

According to the present embodiment, even in a case where the blank of a document is cut with a predetermined margin, it is possible to adjust the document area at the time of cutting out an image area from a scanned image by a user adjusting the margin to size of the document.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present invention, it is possible for a user to easily modify a document recognition state in document recognition processing at the time of multi-cropping processing. Due to this, it is possible for user to eliminate time and effort taken to perform a scan again.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-081885 filed Apr. 23, 2019, which is hereby incorporated by reference wherein in its entirety.

What is claimed is:

1. An apparatus comprising a user interface that presents information to a user and receives an input operation by a user, the apparatus comprising:
   at least one memory that stores a program; and
   at least one processor that executes the program to perform:
      acquiring a result of document recognition processing for a scanned image obtained by scanning a plurality of documents en bloc, wherein the acquired result of the document recognition processing includes positions of document areas detected from the scanned image and a division candidate position for dividing one of the detected document areas; and
      controlling to display a preview screen on the user interface, which displays frames corresponding to the positions of the detected document areas on the scanned image in an overlapping manner, wherein
      the preview screen further displays a first button with which a user gives instructions to divide the one of the detected document area at the division candidate position.

2. The apparatus according to claim 1, wherein in the document recognition processing, the document areas are detected based on object detection processing for the scanned image, and wherein the division candidate position is determined based on an interval between objects included in the detected document area.

3. The apparatus according to claim 1, wherein the first button is arranged at a position corresponding to the division candidate position.

4. The apparatus according to claim 2, wherein the first button is further displayed based on user instructions for a document area in which the division candidate position is not determined.

5. The apparatus according to claim 4, wherein the processor further determines whether the division is possible at a position specified accompanying the user instructions, wherein the first button is displayed in a case where the division is possible is determined.

6. The apparatus according to claim 5, wherein in the determining, whether the division is possible by determining whether an object exists on each straight line extended in a vertical direction and in a horizontal direction from the specified position.

7. The apparatus according to claim 1, wherein the frame indicating an outer edge of each document area detected in the document recognition processing is displayed on the scanned image in an overlapping manner.

8. The apparatus according to claim 1, wherein the first button is arranged along the frame.

9. The apparatus according to claim 7, wherein the first button is arranged on a line indicating a border after division within the frame.

10. The apparatus according to claim 1, wherein information indicating a direction of the division is attached to the first button.

11. The apparatus according to claim 1, wherein the preview screen is updated so that its contents indicating a state after division in response to an operation of the first button.

12. The apparatus according to claim 11, wherein a second button for cancelling division is displayed on the updated preview screen.

13. The apparatus according to claim 1, wherein a third button, for adjusting an outer edge of a document area in which the first button is displayed, is displayed based on user instructions.

14. The apparatus according to claim 13, wherein a fourth button for adjusting a position of the division is further displayed based on user instructions.

15. The apparatus according to claim 1,
   the apparatus is connected with an external apparatus that performs the document recognition processing, and
   the apparatus transmits a request for the division for the document area to the external apparatus based on user operation using the first button.

16. The apparatus according to claim 1, further comprising:
   performing the document recognition processing, and
   performing processing to divide the document area based on user instructions using the first button.

17. A control method of an apparatus comprising a user interface that presents information to a user and receives an input operation by a user, the control method comprising:
   an acquisition step of acquiring a result of document recognition processing for a scanned image obtained by scanning a plurality of documents en bloc, wherein the acquired result of the document recognition processing includes positions of document areas detected from the scanned image and a division candidate position for dividing one of the detected document areas; and
   a display control step of controlling to display a preview screen on the user interface, which displays frames corresponding to the positions of the detected document areas on the scanned image in an overlapping manner, wherein
   on the preview screen, a first button is displayed with which a user gives instructions to divide the one of the detected document area at the division candidate position.

18. A non-transitory computer readable storage medium storing a program for causing a computer to perform a control method of an apparatus comprising a user interface that presents information to a user and receives an input operation by a user, the control method comprising:
   an acquisition step of acquiring a result of document recognition processing for a scanned image obtained by scanning a plurality of documents en bloc, wherein the acquired result of the document recognition processing includes positions of document areas detected from the scanned image and a division candidate position for dividing one of the detected document areas; and
   a display control step of controlling to display a preview screen on the user interface, which displays frames corresponding to the positions of the detected document areas on the scanned image in an overlapping manner, wherein
   on the preview screen, a first button is displayed with which a user gives instructions to divide the one of the detected document area at the division candidate position.

* * * * *